US012680792B2

(12) United States Patent
Lubashevsky

(10) Patent No.: US 12,680,792 B2
(45) Date of Patent: Jul. 14, 2026

(54) COMPACT SUPERSONIC PROJECTILE TRACKING

(71) Applicant: Synchrosense Ltd., Haifa (IL)

(72) Inventor: Yuval Lubashevsky, Haifa (IL)

(73) Assignee: SYNCHROSENSE LTD., Haifa (IL)

( * ) Notice: Subject to any disclaimer, the term of this patent is extended or adjusted under 35 U.S.C. 154(b) by 294 days.

(21) Appl. No.: 18/360,108

(22) Filed: Jul. 27, 2023

(65) Prior Publication Data

US 2024/0035782 A1      Feb. 1, 2024

(30) Foreign Application Priority Data

Jul. 27, 2022      (IL) .......................................... 295152

(51) Int. Cl.
　　*F41J 5/06*　　　　　(2006.01)
　　*G01S 15/66*　　　　(2006.01)
(52) U.S. Cl.
　　CPC ................. *F41J 5/06* (2013.01); *G01S 15/66* (2013.01)
(58) Field of Classification Search
　　CPC .................................... F41J 5/06; G01S 15/66
　　See application file for complete search history.

(56) References Cited

U.S. PATENT DOCUMENTS

| | | |
|---|---|---|
| 4,261,579 A | 4/1981 | Bowyer et al. |
| 4,351,026 A | 9/1982 | Phillips |
| 4,514,621 A | 4/1985 | Knight et al. |
| 4,805,159 A | 2/1989 | Negendank et al. |
| 5,241,518 A | 8/1993 | McNelis et al. |
| 5,247,488 A | 9/1993 | Borberg et al. |

(Continued)

FOREIGN PATENT DOCUMENTS

| | | | |
|---|---|---|---|
| CZ | 2018418 A3 * | 1/2020 | ............... G01V 8/20 |
| EP | 0157397 A2 | 10/1985 | |

(Continued)

OTHER PUBLICATIONS

N. Levanon, "Acoustic hit indicator," in IEEE Transactions on Aerospace and Electronic Systems, vol. 37, No. 1, pp. 304-309, Jan. 2001, doi: 10.1109/7.913692.

(Continued)

*Primary Examiner* — Abdallah Abulaban
(74) *Attorney, Agent, or Firm* — Whitestone Law, PLLC

(57) ABSTRACT

A tracking system including: a plurality of acoustic sensors rigidly held apart from each other and from an acoustically reflective surface; a processor configured to: receive spatial relationships between the plurality of acoustic sensors and between the plurality of acoustic sensors and the acoustically reflective surface; receive a plurality of measurement signals; identify: in the plurality of measurement signals, timing of arrival of a supersonic shockwave of a projectile to the respective sensor; and timing of arrival of a reflection of the supersonic shockwave from the acoustically reflective surface to the respective sensor; determine at least a portion of a trajectory of the projectile, using: the timing of arrival of the supersonic shockwave; the timing of arrival of the reflection; the spatial relationship between the plurality of acoustic sensors; and the spatial relationship between sensors and the spatial relationship between sensors and the acoustically reflective surface.

20 Claims, 12 Drawing Sheets

(56) References Cited

U.S. PATENT DOCUMENTS

| | | | | |
|---|---|---|---|---|
| 5,920,522 | A | 7/1999 | Levanon | |
| 6,198,694 | B1 | 3/2001 | Kroeling et al. | |
| 6,563,763 | B2 | 5/2003 | McNelis | |
| 7,710,828 | B2 | 5/2010 | Barger et al. | |
| 7,782,710 | B1 * | 8/2010 | Uzes | G01S 3/143 |
| | | | | 367/135 |
| 8,320,217 | B1 | 11/2012 | Barger et al. | |
| 10,288,381 | B1 * | 5/2019 | Sirot | F41G 3/26 |
| 2006/0044941 | A1 | 3/2006 | Barger | |
| 2007/0171769 | A1 | 7/2007 | Brinn et al. | |
| 2010/0020643 | A1 | 1/2010 | Barger et al. | |
| 2010/0226210 | A1 * | 9/2010 | Kordis | G01S 5/22 |
| | | | | 367/127 |

FOREIGN PATENT DOCUMENTS

| | | | |
|---|---|---|---|
| EP | 0248018 | A1 | 12/1987 |
| EP | 0684485 | A1 | 11/1995 |
| EP | 2040025 | A1 | 3/2009 |
| GB | 2083177 | A | 3/1982 |
| WO | 1979000452 | A1 | 7/1979 |
| WO | 8605870 | A1 | 10/1986 |
| WO | 1987005706 | A1 | 9/1987 |
| WO | 1991010876 | A1 | 7/1991 |

OTHER PUBLICATIONS

Magand, François, Alain Donzier, and Frédéric Molliex. "Pilar Acoustic Gunshot Detection & Localization system: Principles of acoustic localization of small caliber gunshots." In CFA/DAGA, vol. 4, pp. 563-564. 2004.
Maher et al., Digital Signal Processing Workshop, 12th—Signal Processing Education Workshop, 4th, IEEE, PI, pp. 257-261, 2006.

* cited by examiner

| Receive pressure measurements with time | 200 |

| Identify a direct pressure wave signature from a moving object | 202 |

| Identify reflected pressure wave signature from a reflecting object | 204 |

| Determine at least a portion of a trajectory of the moving object using timing of identified pressure wave signatures | 206 |

COMPACT SUPERSONIC PROJECTILE TRACKING

TECHNOLOGICAL FIELD

The present disclosure, in some embodiments, thereof, relates to projectile tracking and, more particularly, but not exclusively, to tracking of supersonic projectiles.

BACKGROUND ART

Background art, where each cited art is herein incorporated by reference in its entirety, includes:

N. Levanon, "Acoustic hit indicator," in IEEE Transactions on Aerospace and Electronic Systems, vol. 37, no. 1, pp. 304-309, January 2001, doi: 10.1109/7.913692 discloses: "An improved acoustic target is considered. Acoustic targets estimate the hit coordinates of a supersonic projectile using the time of arrival (TOA) of the supersonic shock wave at several acoustic transducers located in the vicinity of the target. An improved target allows oblique hits, likely in firing practices involving roaming infantry and armor. Four trajectory parameters are estimated: two hit coordinates (x,h) on a virtual, vertical, target plane; horizontal angle of incidence; projectile velocity. Explicit expressions are provided of the expected TOA measurements and their derivatives with respect to the estimated parameters. The expressions simplify a least-squares iterative algorithm and accelerate its convergence. Expected error contour maps are provided."

U.S. Pat. No. 4,261,579 discloses: "To determine the position of a bullet relative to a target an array of at least six transducers is provided, the transducers being in two parallel rows of three in a common plane. The instants of detection of the shock wave generated by the bullet are measured and the position of the bullet is calculated from the measured values."

Additional background art, where each cited art is herein incorporated by reference in its entirety, includes: Magand, Francois, Alain Donzier, and Frederic Molliex. "PILAR Acoustic Gunshot Detection & Localization system: Principles of acoustic localization of small caliber gunshots." In CFA/DAGA, vol. 4, pp. 563-564. 2004, U.S. Pat. Nos. 5,241,518, 4,514,621, 6,198,694, 5,920,522, International Patent Application No. WO1979000452, United Kingdom Patent No. GB2083177, U.S. Pat. No. 4,351,026, European Patent No. EP0157397, International Patent Application Publication No. WO1987005706, European Patent No. EP0248018, U.S. Pat. No. 4,805,159 International Patent Application Publication No. WO1991010876, U.S. Pat. No. 5,247,488 European Patent No. EP0684485, U.S. Pat. No. 6,563,763 US Patent Application Publication No. US20060044941, US Patent Application Publication No. US20070171769, European Patent No. EP2040025, US Patent Application Publication No. US20100020643, U.S. Pat. Nos. 8,320,217, and 7,710,828.

Acknowledgement of the above references herein is not to be inferred as meaning that these are in any way relevant to the patentability of the presently disclosed subject matter.

GENERAL DESCRIPTION

Following is a non-exclusive list of some exemplary embodiments of the disclosure. The present disclosure also includes embodiments which include fewer than all the features in an example and embodiments using features from multiple examples, even if not listed below.

Example 1. A projectile tracking system comprising:
a plurality of acoustic sensors rigidly held apart from each other and apart from an acoustically reflective surface;
a processor configured to:
  receive a spatial relationship between said plurality of acoustic sensors and a spatial relationship between said plurality of acoustic sensors and said acoustically reflective surface;
  receive a plurality of measurement signals comprising a measurement signal corresponding to each of said plurality of acoustic sensors;
  identify:
    in one or more of said plurality of measurement signals, timing of arrival of a supersonic shockwave of a projectile to the respective sensor; and
    in at least one of said plurality of measurement signals, timing of arrival of a reflection of said supersonic shockwave from said acoustically reflective surface to the respective sensor;
  determine at least a portion of a trajectory of the projectile, using:
    said timing of arrival of said supersonic shockwave;
    said timing of arrival of said reflection;
    said spatial relationship between said plurality of acoustic sensors; and
    said spatial relationship between sensors and said spatial relationship between sensors and said acoustically reflective surface.

Example 2. The system according to Example 1, wherein said acoustically reflective surface is a target.

Example 3. The system according to any one of Examples 1-2, wherein said projectile is a bullet.

Example 4. The system according to any one of Examples 1-3, wherein said processor is configured to identify timing of arrival of said supersonic shockwave and said timing of arrival of said reflection from a single measurement signal, of said plurality of measurement signals, associated with a single sensor.

Example 5. The system according to any one of Examples 1-4, wherein said plurality of acoustic sensors are each spaced apart from said acoustically reflective surface by a distance selected based on a sensing relaxation time of said plurality of acoustic sensors.

Example 6. The system according to Example 5, wherein said distance is at least double said relaxation time multiplied by a speed of sound.

Example 7. The system according to Example 6, wherein said speed of sound is a minimum speed of sound for a range of operation temperatures.

Example 8. The system according to any one of Examples 1-7, wherein said processor is configured to:
  receive a spatial relationship between said plurality of acoustic sensors and an additional acoustically reflective surface positioned away from said plurality of acoustic sensors;
  identify, in at least one of said plurality of measurement signals, timing of arrival of a second reflection of said supersonic shockwave from said additional acoustically reflective surface to the respective sensor;
  determine at least a portion of a trajectory of the projectile, using
    said timing of arrival of said second reflection; and
    said spatial relationship between said sensors and said additional acoustically reflective surface.

Example 9. The system according to Example 8, wherein said plurality of acoustic sensors are each spaced apart from said additional acoustically reflective surface by a distance selected based on a sensing relaxation time of said plurality of acoustic sensors.

Example 10. The system according to Example 8, wherein said plurality of acoustic sensors are each spaced apart from said additional acoustically reflective surface by a distance selected to maintain reflections sensed by said plurality of acoustic sensors from said additional acoustically reflective surface to below a threshold.

Example 11. The projectile tracking system according to any one of Examples 9-10, wherein said second acoustically reflective surface is a ground surface.

Example 12. The system according to any one of Examples 1-11, wherein said plurality of acoustic sensors comprises three acoustic sensors and wherein said processor is configured to receive three measurement signals one from each of said three acoustic sensors.

Example 13. The system according to Example 12, wherein said sensors are positioned so that, for a for a range of projectile trajectories, each of said three acoustic sensors senses said supersonic shockwave and said reflection;

wherein said processor is configured, for said range of projectile trajectories to:

identify, in each of said three sensor signals, timing of arrival of said supersonic shockwave and timing of arrival of said reflection;

determine a position at which said projectile intersects with a plane of said acoustically reflective surface to an accuracy of 1 cm.

Example 14. The projectile tracking system according to Example 13, wherein said range of trajectories includes projectiles on trajectories which hit said acoustically reflective surface.

Example 15. The system according to Example 14, wherein said range of projectile trajectories comprises trajectories where said projectile passes through a plane of said acoustically reflective surface at a distance of less than 50 cm away from said acoustically reflective surface.

Example 16. The projectile tracking system according to any one of Examples 1-15, comprising said acoustically reflective surface.

Example 17. The system according to any one of Examples 1-16, wherein said plurality of acoustic sensors are hosted by a tracking device having an elongate body with a maximal extent of 30 cm perpendicular to a central longitudinal axis of said elongate device housing.

Example 18. The system according to Example 17, wherein said maximal extent perpendicular to said central longitudinal axis of said elongate body is 10 cm.

Example 19. The system according to any one of Examples 17-18, wherein a maximal extent of said elongate body is 50 cm.

Example 20. The system according to any one of Examples 1-19, wherein said plurality of acoustic sensors are hosted by a tracking device having an expandable body, where, said expandable body expands to increase distance between two or more of said plurality of acoustic sensors.

Example 21. The system according to any one of Examples 1-20, wherein one or more of said sensors is a reflection sensor, positioned to sense said reflection of said shockwave from said acoustically reflective surface, wherein said system includes a shield positioned to acoustically shield said reflection sensor.

Example 22. The system according to Example 21, wherein a body of a device hosting said plurality of acoustic sensors forms said shield, said reflection sensor being hosted by said device at a position located between said device and said reflective surface.

Example 23. The projectile tracking system according to any one of Examples 1-22, wherein said acoustically reflective surface comprises an external surface of a building.

Example 24. The projectile tracking system according to any one of Examples 1-22, wherein said acoustically reflective surface comprises an external surface of a vehicle.

Example 25. The projectile tracking system according to any one of Examples 1-24, wherein said processor is configured to identify, from one or more of said plurality of measurement signals, a timing of a blast signal of said projectile leaving a firearm.

Example 26. The projectile tracking system according to Example 25, wherein said processor is configured to determine, using said timing of said blast signal, a location of said firearm with respect to one or more other portion of said system.

Example 27. A method of supersonic projectile tracking comprising:

receiving a plurality of measurement signals from a plurality of acoustic sensors rigidly held apart from each other and apart from an acoustically reflective surface;

receive a spatial relationship between sensors and a spatial relationship between sensors and said acoustically reflective surface;

receive a plurality of measurement signals comprising a measurement signal corresponding to each of said plurality of acoustic sensors;

identifying:

in one or more of said plurality of measurement signals, timing of arrival of a supersonic shockwave of a projectile to the respective sensor; and in at least one of said plurality of measurement signals, timing of arrival of a reflection of said supersonic shockwave from said acoustically reflective surface to the respective sensor;

determining at least a portion of a trajectory of the projectile, using:

said timing of arrival of said supersonic shockwave;

said timing of arrival of said reflection;

said known spatial relationship between said plurality of acoustic sensors; and said spatial relationship between sensors and said spatial relationship between sensors and said acoustically reflective surface.

Example 28. The method according to Example 27, wherein said identifying includes identifying timing of a change in pressure above a pressure threshold change.

Example 29. The method according to any one of Examples 27-28, wherein said identifying includes identifying timing of a differential of pressure above a differential threshold.

Example 30. The method according to any one of Examples 27-29, wherein said identifying includes identifying timing of a second differential of pressure above a second differential threshold.

Example 31. The method according to any one of Examples 27-30, comprising:

receive a spatial relationship between said plurality of acoustic sensors and an additional acoustically reflective surface positioned away from said plurality of acoustic sensors;

identify, in at least one of said plurality of measurement signals, timing of arrival of a second reflection of said supersonic shockwave from said additional acoustically reflective surface to the respective sensor;

determine at least a portion of a trajectory of the projectile, using said timing of arrival of said second reflection; and said spatial relationship between said sensors and said additional acoustically reflective surface.

Example 32. The method according to any one of Examples 27-31, comprising measuring said spatial relationship between said plurality of acoustic sensors.

Example 33. The method according to any one of Examples 27-32, comprising measuring said spatial relationship between said plurality of acoustic sensors and said acoustically reflective surface.

Example 34. The method according to any one of Examples 27-33, wherein said identifying comprises identifying, from one or more of said plurality of measurement signals, a timing of a blast signal of said projectile leaving a firearm.

Example 35. The method according to Example 34, wherein said determining comprises determining, using said timing of said blast signal, a location of said firearm with respect to said plurality of acoustic sensors.

Example 36. A supersonic projectile tracking system comprising:

a tracking device comprising at least three acoustic sensors rigidly held spaced apart from each other, each having a sensing relaxation time;

a stand configured to rigidly hold said tracking device and an acoustically reflective surface so that said plurality of acoustic sensors are each separated by at least a first distance away from said acoustically reflective surface;

wherein, for a range of supersonic projectile trajectories, said first distance is selected so that, for each of said at least three acoustic sensors a time delay between arrival of a projectile supersonic shockwave and arrival of a reflection of said projectile supersonic shockwave at said acoustically reflective surface is at least said sensing relaxation time.

Example 37. The system according to Example 36, wherein said first distance is at least double said sensing relaxation time multiplied by a speed of sound.

Example 38. The system according to Example 37, wherein said speed of sound is a minimum speed of sound for a range of operation temperatures.

Example 39. The system according to any one of Examples 36-38, wherein said acoustically reflective surface is a target.

Example 40. The system according to any one of Examples 36-39, comprising a processor configured to:

receive a spatial relationship between said plurality of acoustic sensors and a spatial relationship between said plurality of acoustic sensors and said acoustically reflective surface;

receive a plurality of measurement signals comprising a measurement signal corresponding to each of said plurality of acoustic sensors;

identify:

in one or more of said plurality of measurement signals, timing of arrival of a supersonic shockwave of a projectile to the respective sensor; and in at least one of said plurality of measurement signals, timing of arrival of a reflection of said supersonic shockwave from said acoustically reflective surface to the respective sensor;

determine at least a portion of a trajectory of the projectile, using:

said timing of arrival of said supersonic shockwave;

said timing of arrival of said reflection;

said spatial relationship between said plurality of acoustic sensors; and said spatial relationship between sensors and said spatial relationship between sensors and said acoustically reflective surface.

Example 41. The system according to any one of Examples 36-40, wherein said projectile is a bullet.

Example 42. The system according to any one of Examples 40-41, wherein said processor is configured to identify timing of arrival of said supersonic shockwave and said timing of arrival of said reflection from a single measurement signal, of said plurality of measurement signals, associated with a single sensor.

Example 43. The system according to any one of Examples 36-42, wherein said a stand is configured to rigidly hold said tracking device and away from an additionally reflective surface by at least a second distance away from said additional acoustically reflective surface.

Example 44. A method of supersonic projectile tracking comprising:

receiving at least one measurement signal from at least one acoustic sensor rigidly held apart from a plurality of acoustically reflective surfaces;

receive a spatial relationship between said at least one sensor said plurality of acoustically reflective surfaces;

receive a measurement signal from said at least one acoustic sensor;

identifying:

timing of arrival of a supersonic shockwave of a projectile to the respective sensor; and timing of arrival of a reflection of said supersonic shockwave from each of said plurality of acoustically reflective surfaces;

determining at least a portion of a trajectory of the projectile, using:

said timing of arrival of said supersonic shockwave;

said timing of arrival of said reflection for each of said plurality of acoustically reflective surfaces;

said spatial relationship between said sensor and said plurality of acoustically reflective surfaces.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting. As will be appreciated by one skilled in the art, some embodiments of the present invention may be embodied as a system, method, or computer program product. Accordingly, some embodiments of the present invention may take the form of an entirely hardware embodiment, an entirely software embodiment (including firmware, resident software, micro code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as assessing a subject, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 12 is a simplified schematic of a projectile tracking system, according to some embodiments of the disclosure;

FIG. 13 is a simplified schematic of a projectile tracking system, according to some embodiments of the disclosure;

In some embodiments, although non-limiting, in different figures, like numerals are used to refer to like elements, for example, element 128 in FIG. 1A corresponding to element 628 in FIG. 6.

DETAILED DESCRIPTION OF EMBODIMENTS

Figure 1A:
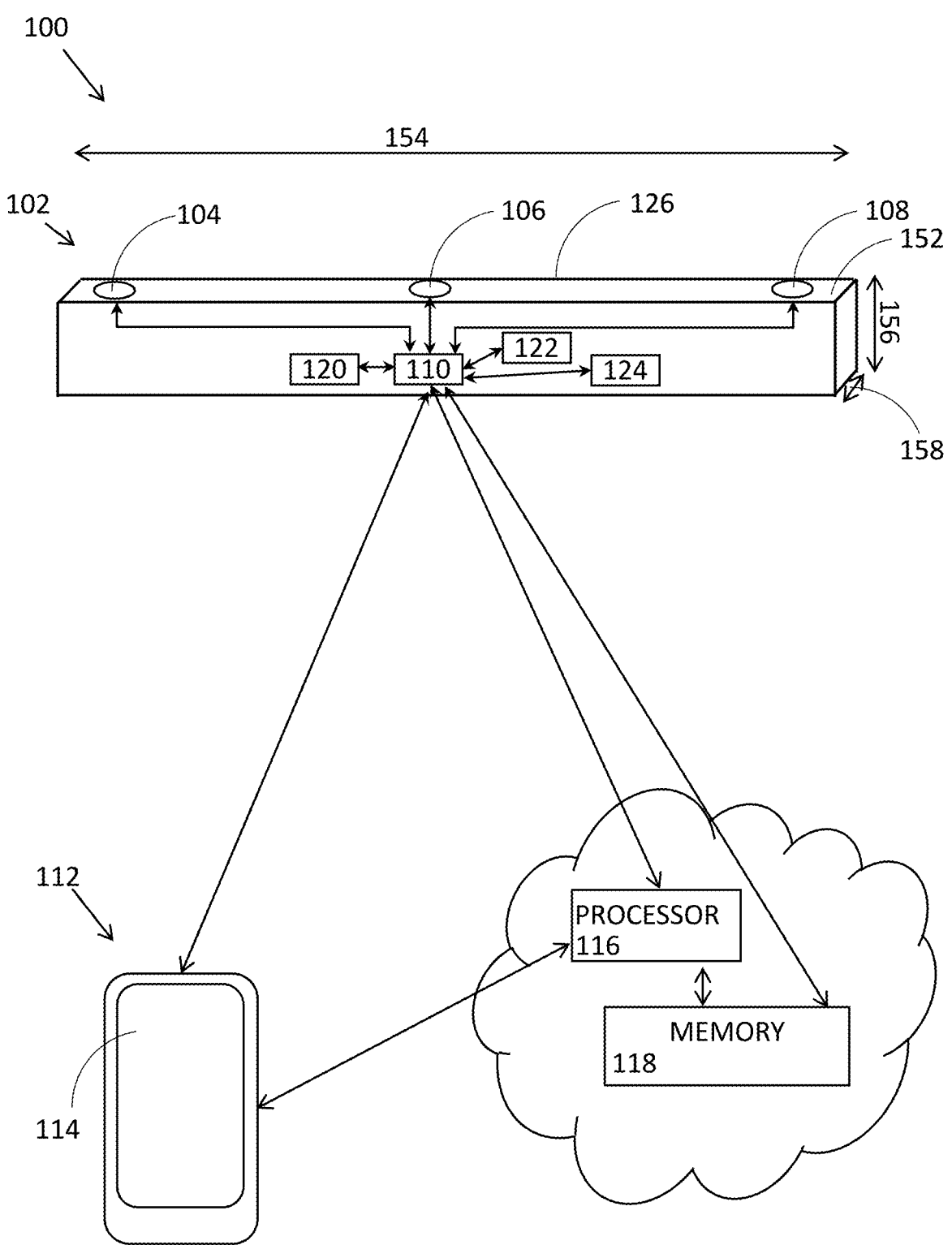
FIG. 1A is a simplified schematic of a projectile tracking system, according to some embodiments of the disclosure.

The present disclosure, in some embodiments, thereof, relates to projectile tracking and, more particularly, but not exclusively, to tracking of supersonic projectiles.

Overview

A broad aspect of some embodiments of the disclosure relates to determining at least a portion of a trajectory of a supersonic projectile by acoustically sensing a supersonic shockwave associated with a path of the supersonic projectile and acoustically sensing a reflection at one or more acoustically reflective surface of the supersonic shockwave.

An aspect of some embodiments of the disclosure relates to a compact measurement device including one or more sensors which tracks a supersonic projectile (e.g. a bullet) by sensing directly received supersonic shockwave/s and supersonic shockwave/s reflected from one or more acoustically reflective surfaces. Where, for example, sensing of a reflection of the shockwave is, in some embodiments, understood to generate a virtual sensor, located at a "mirror image" position where the acoustically reflective surface acts as the "mirror".

In some embodiments, timing of sensed arrival of the supersonic shockwave at different positions in space (e.g. by different sensors of a plurality of sensors, where one or more sensor, in some embodiments, is a virtual sensor) of a supersonic shockwave generated by a supersonic projectile (e.g. a bullet) is used to determine at least a portion of a trajectory of the projectile. Where, in some embodiments, the portion of the trajectory includes a position where the projectile hits a target.

Generally, the wider the distances between sensors, the higher an accuracy of the projectile trajectory determined using time of arrival of shockwaves at the sensors. Where, for example, for longer times between sensed shockwaves (e.g. associated with distance between the sensors), accuracy limitation/s of the measurement (and/or identification of the shockwave from the measurements) is a smaller proportion of the measurement values.

A potential advantage of sensing of reflected supersonic shockwave/s (e.g. in addition to directly received shockwave/s), for example, is increased effective size of the device (and/or enables a smaller device) e.g. by effectively moving a sensor sensing the reflected shockwave to a virtual mirror position away from the sensor real position.

A potential advantage of sensing of reflected supersonic shockwave/s (e.g. in addition to directly received shockwave/s) is the potential for a more compact device and/or smaller spaces between sensors of a device e.g. for a same accuracy of projectile tracking:

A potential advantage of sensing of a reflected supersonic shockwave is measurements at a longer distance path from the shockwave point of generation to the point of measurement e.g. longer than that provided by real sensors located at a physical volume of the measurement device.

A potential advantage of sensing of reflected supersonic shockwaves/s (e.g. in addition to directly received shockwave/s), for example, is the ability to use a device having a smaller number of sensors, e.g. for a given accuracy of trajectile tracking. For example, in some embodiments, projectile tracking is using acoustic sensor signals from less than four real acoustic sensors, for example, using three real acoustic sensors. For example, in some embodiments, projectile tracking is using a plurality of acoustically reflective surfaces and two or less sensors, or a single sensor.

In some embodiments, reflection of a shockwave occurs at more than one acoustically reflective surface, sequentially (also herein termed a multi-path reflection), before being sensed. A potential advantage of sensing of multi-path reflection is increased numbers of virtual sensors which potentially increase accuracy of tracking, where position of the reflective surfaces geometrically with respect to the sensors is known sufficiently accurately.

In some embodiments, a marksmanship target provides an acoustically reflective surface. In some embodiments, reflection/s are sensed from more than one acoustically reflective surface (e.g. a ground surface providing a second acoustically reflective surface).

In some embodiments, measurements are used to determine at least a portion of the trajectory which includes a contact position of the projectile with a target surface. In some embodiments, (e.g. where the projectile does not hit the target) the portion of the trajectory includes a location at which the projectile contacts a plane of the target surface e.g.

where the target surface is generally planar in shape. Additionally or alternatively, in some embodiments, the portion of the trajectory is a portion adjacent to the target. Where the target is a visible object to which a user aims the projectile e.g. for marksmanship training and/or practice.

In some embodiments, a single sensor senses both a shockwave and a reflection of the shockwave from an acoustically reflective surface.

In some embodiments, the plurality of sensors are positioned sufficiently separated from the acoustically reflective surface (or surfaces). For example, to enable separate identification, e.g. in acoustic sensor measurement data, of timing of a supersonic shockwave and its reflection from an acoustically reflective surface. For example, to reduce noise sensed by the sensor/s associated with reflection of the shockwave (e.g. associated with scattering reflections at a non-planar acoustically reflective surface).

For example, in an exemplary embodiment, a reflective surface is positioned at a distance from one or more of the sensors sufficient for both a shockwave and its reflection from the reflective surface to be identified from a signal from the one or more sensors. Where, in some embodiments, sensors are positioned at a sufficient distance from a target which provides a reflective surface. Where, in some embodiments, one or more of the sensors is separated from a ground surface (e.g. also separated from the ground surface). Where separation from the ground surface is sufficient for the ground surface to act as a reflecting surface. Or, in some embodiments, separation of sensor/s from the ground surface (e.g. where the ground surface is not sufficiently flat) is at a distance selected to reduce noise sensed by sensor/s associated with reflection of the shockwave by the ground surface.

In some embodiments, separation between the sensor/s and the acoustically reflective surface is selected so that a shockwave and its reflection are identifiable within the sensor measurement signal. For example, where a shortest straight line distance between a sensor (e.g. each sensor) and the acoustically reflective surface (e.g. target) is larger than a speed of sound multiplied by double a relaxation time of the sensor.

Where, in some embodiments, relaxation time of the sensor is defined as a time delay after sensing of a first shockwave at which the sensor is able to detect a second shockwave. For example, at a time where oscillation/s and/or magnitude of sensed sensor signal has reduced to a level (the level in some embodiments measured as a time average e.g. magnitude averaged for a microsecond, or 1-100 microseconds, or 10-70 microseconds, or lower or higher or intermediate times or ranges) which are 1-10, or 2-7, or 3-6, or about 4 times lower than the first shockwave and/or an average expected magnitude of shockwaves (e.g. 50-200 decibels, or 100-150 decibels, or about 125 decibels).

In some embodiments, separation between the sensor/s and the acoustically reflective surface is selected so that a reflection of a first shockwave and a direct second shockwave, the first shockwave preceding the second shockwave arriving at a single sensor, are identifiable within the sensor measurement signal.

In some embodiments, one or more sensor senses only a directly incident shockwave or a reflected shockwave.

For example, where, in some embodiments, an acoustic path of a shockwave to one or more sensor is acoustically obscured and/or blocked. For example, by one or more system component. For example, in some embodiments, an acoustic sensor is positioned at a back surface of a tracking device, where a body of the device is located between the sensor and a path of the projectile and/or of its supersonic shockwave and where the acoustic sensor is not obscured from a path between an acoustically reflective surface and the sensor. For example, in an exemplary embodiment, one or more acoustic sensor is positioned at a surface of the tracking device facing the acoustically reflective surface.

Where, in some embodiments, trajectile tracking includes tracking of a position at where the projectile hits the target to an accuracy of within 1-3 cm, or within about 1 cm, or lower, or higher, or intermediate ranges, or accuracies.

In some embodiments, the acoustic sensors are connected rigidly, a potential benefit of rigid connection being lesser (or no) requirement for calibration of the device before use. Where calibration would be, for example, to determine position of the sensors. Rigid connection of sensors, in some embodiments, is by connection to a projectile tracking device housing and/or one or more structure connected to and/or hosted by the housing.

In some embodiments, for example, where a tracking device includes sensors with adjustable position (e.g. an expandable device), one or more calibration measurement is collected and is used in determining projectile trajectory from sensor measurements.

In some embodiments, the projectile tracking device includes an elongate housing where the width and/or height of the device (and/or device housing) is at least half that of a length of the device and/or where length of the device (and/or device housing) is at least 1.5-50 times, or at least 1.5-20 times, or lower, or higher, or intermediate ranges, or multiples, of the device (and/or device housing) height and/or width.

In some embodiments, the plurality of sensors are disposed in a generally linear configuration. Where, for example, in some embodiments, a plurality of sensors are positioned with respect to each other, centers of the sensors deviating from being positioned on a straight line by at most 1 cm, or at most 0.1-2 cm, or lower, or higher, or intermediate distances, or ranges.

In some embodiments, plurality of sensors are disposed along an elongate surface of the elongate housing, e.g. for example, on the largest elongate surface, e.g. a surface parallel to a central longitudinal axis of the device and/or device housing.

Optionally, in some embodiments, a plane of the acoustically reflective surface (e.g. the target) is positioned in a direction having a component parallel to, or is at most degrees from parallel to; one or more of a central longitudinal axis of the device and/or device housing (e.g. a plane of the device housing), and a best fit straight line connecting the plurality of sensors.

Alternative geometrical configuration/s of the sensors and/or acoustically reflective surface are envisioned and encompassed by embodiments of this disclosure. Where, generally, projectile trajectories are determined using known geometrical relationships between sensor/s and/or acoustically reflective surfaces where the specific positioning of the sensor/s and reflective surfaces are, in some embodiments, design decisions e.g. and optionally, in some embodiments, do not affect the modelling and/or determining of the trajectory based on sensor measurements.

In general, non-linear arrangements of sensor/s and/or non-parallel orientation of the plane of the acoustically reflective sensor are envisioned and encompassed. For example, where the plane of the acoustically reflective surface is at an angle to a central longitudinal axis of the device and/or device housing, and a best fit straight line connecting the plurality of sensors e.g. the axis and/or plane intersecting the plane of the acoustically reflective surface.

In some embodiments, the projectile tracking device is compact, for example, a long axis length of the projectile tracking device and/or housing of the device is 10-100 cm, or 20-50 cm, or 30-50 cm, or about 40 cm, or lower, or higher, or intermediate lengths, or ranges.

In some embodiments, the device is lightweight, for example, weighing at most 100 g-2 kg, or 100 g-1 kg, or 100-500 g, or 100-200 g, or about 150 g, or lower, or higher, or intermediate weights, or ranges.

A potential benefit of a small sized and/or lightweight projectile tracking device is portability of the device e.g. for arms training in different locations.

In some embodiments, a tracking device includes more than one configuration. For example, in some embodiments, the tracking device is expandable having a contracted configuration and an expanded configuration. Where, in some embodiments, expansion of the device increases a distance between one or more sensor of the device. A potential advantage being a compact device (e.g. for ease of transport) for a given accuracy provided by distance between sensors.

In some embodiments, the device includes a body where one or more portion configured to host a sensor has an adjustable distance from the body.

For example, in some embodiments, the device includes one or more portion which unfold (e.g. about hinge/s) from the body.

For example, in some embodiments, the device includes one or more portion which telescopically expands away from the body.

For example, in some embodiments, a kit includes a device body and a part which is attached to the body by one or more connector, the part in some embodiments, including an acoustic sensor e.g. where connection is a mechanical connection and optionally a data and/or power connection.

In some embodiments, once one or more part is expanded from and/or attached to the device body, the part is rigidly fixed in position. In some embodiments, the expansion itself rigidly fixes the part e.g. the expanding activating a lock.

Optionally, in some embodiments, acoustic sensor measurements, a direction and/or position and/or distance of the shooter to the sensor/s is determined e.g. using a ballistic model.

Optionally, in some embodiments, an acoustic blast signal is identified in acoustic sensor measurements. Where, in some embodiments, timing of the blast signal (e.g. at different sensor/s), for example, with respect to shockwave sensing, is used to determine direction and/or distance and/or position of the shooter to the sensor/s. Where, in some embodiments, the blast signal is the acoustic signal associated with launch of the projectile from the firearm.

In some embodiments, acoustic sensors include different types of sensor. Where, for example, in some embodiments, a small number of higher sensitivity acoustic sensor/s are used to sense the blast signal (and optionally the shockwave), and additional sensor/s required for sensing of the shockwave are less sensitive.

In some embodiments, the projectile is a bullet e.g. launched from a firearm.

In some embodiments, the determined trajectory and/or position is communicated e.g. to one or more user. Where, in some embodiments, user/s include a person launching the projectiles (e.g. person shooting the firearm). Where, in some embodiments, alternatively or additionally, user/s include another individual, e.g. a person involved in marksmanship training of the person shooting the gun. A potential benefit of such feedback is increased speed of practice and/or training. For example, where user/s receive feedback on accuracy of marksmanship without physically having to check a target. A particular advantage in long range target training e.g. sniper training e.g. where the target is separated from the user by more than 200 m.

An aspect of some embodiments of the disclosure relates to a modular system having a variable number of projectile sensing devices. Where the number of devices and/or positioning of the devices is selected based on a required sensitivity and/or size and/or shape of a zone in which projectiles are to be tracked. In an exemplary embodiment a second projectile sensing device is orientated vertically and positioned outside a zone in which projectiles are expected, additional sensor measurements of the second device potentially increasing vertical resolution of the projectile tracking. In some embodiments, the projectile sensing devices of the modular system are connected e.g. to synchronize measurement timings e.g. directly and/or via an additional (e.g. external) processor.

An aspect of some embodiments of the disclosure relates to a stand for a tracking device attachment and/or position next to a structure. Where, in some embodiments, the structure provides one or more acoustically reflective surface for sensor/s of the device. Where the stand is configured to support the device. In some embodiments, the stand is attached to a vehicle. In some embodiments, the stand is attached to and/or positioned next to (e.g. at a known separation from) a structure e.g. a stationary structure e.g. a building. In some embodiments, the device determines projectile trajectories to provide information to a user as to where a shooter or shooter/s are located and/or as to which portions of a vehicle and/or structure have been affected by the projectiles. For example, with time e.g. providing a record of a live fire incident indication system e.g. for military and/or law enforcement purposes.

In some embodiments, a commercially available target stand is used. Where, in some embodiments, one or more element is used when supporting the tracking device using the stand. In some embodiments, a commercially available target stand is used where the stand is adjusted, for example, connection features are added to the stand. For example, in an exemplary embodiment, a stand has notches cut out of portion/s of the stand, the notches sized and shaped to hold the tracking device and positioned to hold the tracking device at a desired distance from the target and/or ground.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1A is a simplified schematic of a projectile tracking system 100, according to some embodiments of the disclosure.

In some embodiments, system 100 includes a plurality of acoustic sensors 104, 106, 108. In some embodiments, sensors 104, 106, 108 have known position with respect to each other. For example, are rigidly attached to each other and/or to a stand.

In an exemplary embodiment, sensors 104, 106, 108 are hosted by an electronic tracking device 102. Where, in some embodiments, sensors 104, 106, 108 are rigidly held in position by portion/s of electronic tracking device 102. For example, e.g. by connection to a housing 126 and/or internal connector/s.

In some embodiments, tracking device 102 includes 3-10 acoustic sensors, or 3-5, or lower, or higher, or intermediate numbers of acoustic sensors.

In some embodiments, a plurality of sensors 104, 106, 108 are arranged linearly. For example, along a surface 152 of housing 126.

Optionally, in some embodiments, system 100 includes additional acoustic sensor/s (not illustrated). Where, in some embodiments, the additional acoustic sensor/s are not part of and/or not rigidly attached to tracking device 102. In some embodiments, system 100 includes an additional array of sensors e.g. hosted by an additional tracking device, which, for example, includes one or more feature of tracking device 102. Where use of a plurality of tracking devices, in some embodiments, includes one or more feature as described regarding and/or illustrated in FIG. 18.

In some embodiments, tracking device housing 126 is elongate having a length 154, height 156, and width 158. Where length 154 is at least 1.5-50 times, or at least 1.5-times, or lower, or higher, or intermediate ranges, or multiples, height 156 and/or width 158.

In some embodiments, system 100 includes one or more processor 110, 116. In some embodiments, tracking device 102 hosts a processor 110.

In some embodiments, system 100 (e.g. tracking device 102) includes one or more additional sensor 120.

Suitable acoustic sensors, in some embodiments, include piezoelectric microphones, and/or microphones having high Acoustic Overload Point (AOP) e.g. able to measure pressures of up to 100 dB, or up to 120 dB, or up to 150 dB, or up to 170 dB. In some embodiments, a MEMS piezoelectric microphone is used for one or more sensor. In an exemplary embodiment, Vesper VM2020 microphones are used for one or more of the acoustic sensors.

For example, one or more temperature sensor 120. Where, in some embodiments, temperature sensor measurement/s are used to determine a speed of sound when determining projectile trajectory using sensed time of arrival of shockwaves to sensors. In some embodiments, a temperature sensor is shielded e.g. from the sun e.g. positioned on an underside of the device.

For example, one or more wind gauge 120.

In some embodiments, alternatively or additionally to including a temperature sensor, system 100 receives weather information e.g. publicly available weather information e.g. from the cloud e.g. to processor 116 and/or processor 110. Where, in some embodiments, weather information includes one or more of temperature, humidity, wind speed/s.

In some embodiments, tracking device 102 includes one or more user interface 122 e.g. a light which when illuminated indicates that the system is operational.

In some embodiments, tracking device 102 includes a power supply 124 e.g. a battery and/or connectivity to a power supply 124 e.g. electrical circuitry for connection to an external power supply.

Optionally, in some embodiments, tracking device processor 110 includes a memory. Which, for example, stores sensor measurement/s and/or instruction/s for operation of tracking device 102 elements.

In some embodiments, tracking device processor 110 is connected (to one or both of an external processor 116 (e.g. hosted at the cloud), an external memory 118, and a processor of an external electronic device 112. Where, in some embodiments, one or both of the connections include wireless connection e.g. where tracking device includes a transceiver connected to processor 110 and/or one or both of the connections include wired connections.

In some embodiments, a plurality of tracking devices 102 together provide data e.g. to processor 116, data collected, in some embodiments, being used to generate and/or improve measurement accuracy and/or training e.g. training instructions and/or feedback. Where, in some embodiments, data is used to analyze marksmanship and/or training of individual/s and/or groups of individuals (e.g. via organization).

In some embodiments, electronic device 112 includes one or more user interface 114 (e.g. touchscreen of a cell phone). For example, for display information regarding accuracy of marksmanship e.g. as determined by system 100. For example, to receive inputs from user/s.

In some embodiments, electronic device 112 includes a personal computer and/or television equipment. Additionally or alternatively, electronic device 112 includes a portable personal electronic device e.g. laptop computer e.g. a cell phone e.g. tablet. In some embodiments, software for interaction with system 100 (e.g. an application) is downloaded onto electronic device 112.

Figure 1B:
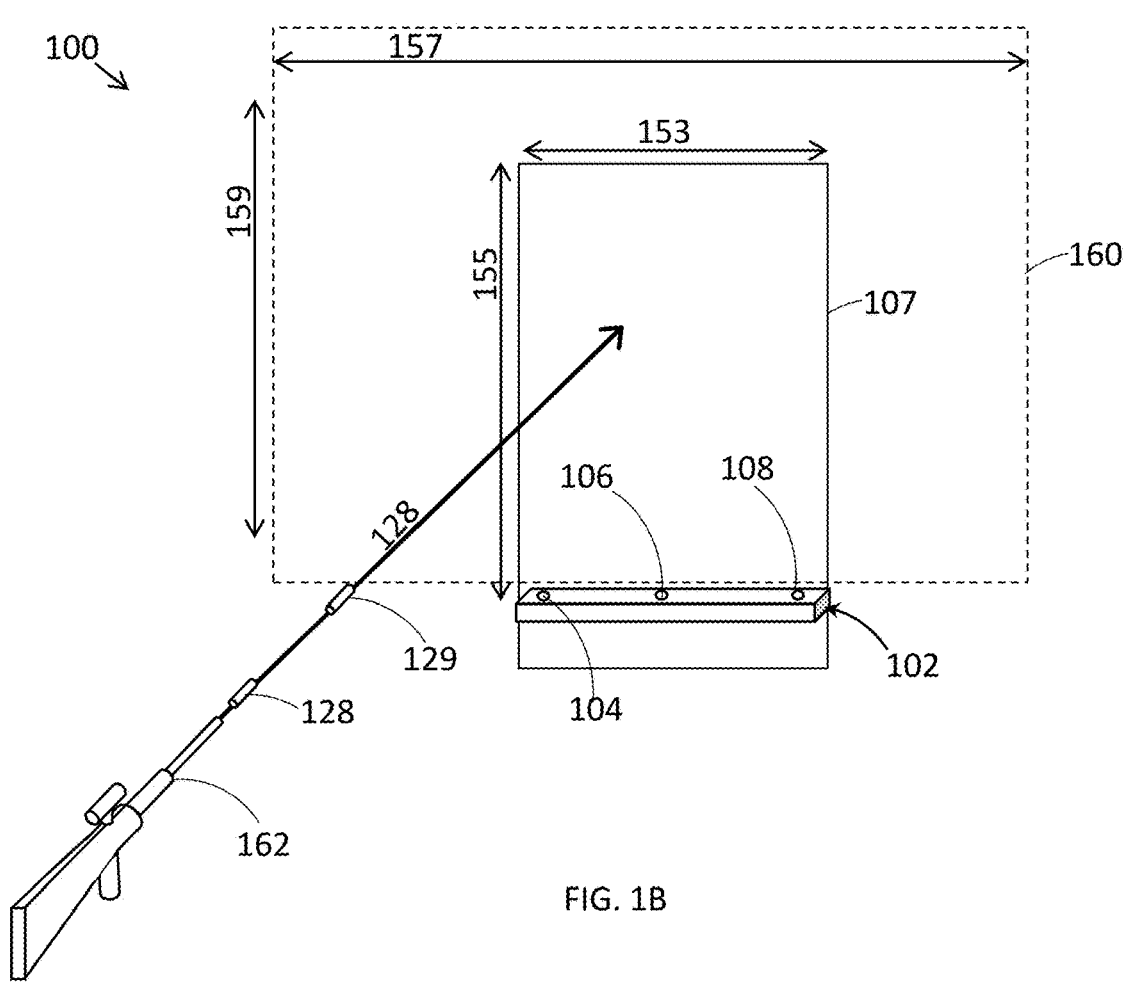
FIG. 1B is a simplified schematic illustrating use of a projectile tracking system, according to some embodiments of the disclosure.

FIG. 1B is a simplified schematic illustrating use of a projectile tracking system 100, according to some embodiments of the disclosure.

In some embodiments, system 100 includes one or more feature as illustrated in and/or described regarding FIG. 1A.

For example, in some embodiments, system 100 includes a projectile tracking device 102 which includes one or more feature as illustrated and/or described regarding tracking device 102 FIG. 1A e.g. a plurality of acoustic sensors 104, 106, 108.

In some embodiments, system 100 includes an acoustically reflective surface 106 which, in some embodiments, forms a target.

FIG. 1B illustrates an exemplary firearm 162 from which a projectile follows a path 128 (the projectile at different times occupying projectile positions 128, 129) to intercept target 106.

Figure 2:
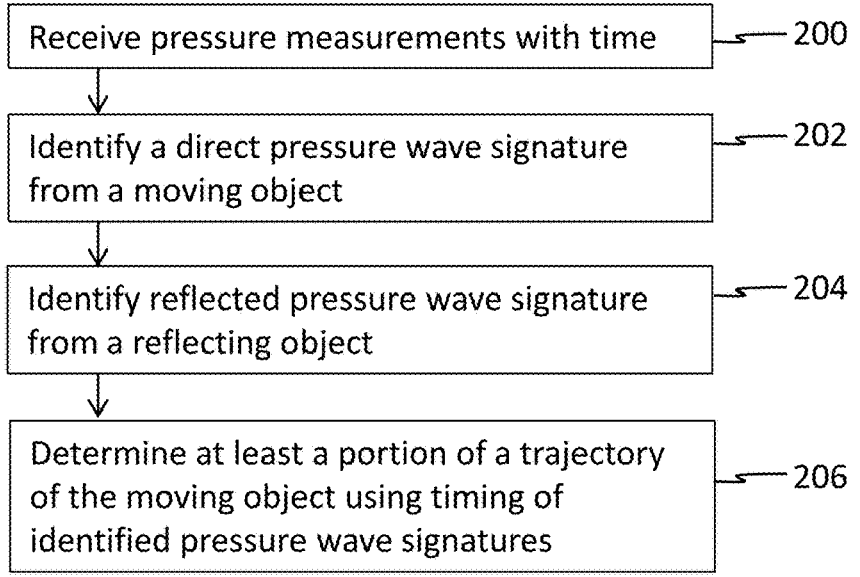
FIG. 2 is a method of projectile tracking, according to some embodiments of the disclosure.

In some embodiments, system 300 (e.g. using sensors 104, 106, 108 senor signals) e.g. according to one or more feature of FIG. 2, determines a position at which the projectile intercepts target 106 and/or (e.g. where the projectile misses the target) intercepts a plane of target 106 within a detection area 160. In some embodiments, outside target 106, but within area 160, determining of the intercept position is at a lower accuracy. In some embodiments, outside area 160 determining of the intercept position is a lower accuracy e.g. than when the projectile intercepts target 106 and/or area 160.

In some embodiments, area 160 is centered around target 107 and/or device 102.

In an exemplary embodiment, target 106 has a width 153 and a height 155. Where width 153, in some embodiments, is 30-200 cm, or 30-100 cm, or 30-70 cm, or about 50 cm or lower, or higher, or intermediate ranges. Where height 155, in some embodiments, is or 50-200 cm, or 100-200 cm, or 120-170 cm, or about 150 cm, or lower, or higher, or intermediate ranges or heights. Where, in an exemplary embodiment, width 153 is about 50 cm and height 155 is about 150 cm.

In some embodiments, area 160 has a width 157 and a height 159. Where width 157 and/or height 159, in some embodiments, is 100-400 cm, or 100-300 cm, or 150-250 cm, or about 200 cm or lower, or higher, or intermediate ranges, or distances. Where, in an exemplary embodiment, width and height are both about 200 cm.

In some embodiments, tracking of a projectile hit to target 107 and/or passage across the plane of target 107 in area 160 is to an accuracy of 0.2-4 cm, or 0.5-2 cm, or or about 1 cm, or lower, or higher, or intermediate ranges, or accuracies.

Where accuracy, in some embodiments, is determined by distance between sensor/s 104, 106, 108 and target 106 (and/or other reflective surface/s).

Optionally, in some embodiments, a portion of a trajectory of the projectile e.g. proximal to target 102 is determined.

Optionally, in some embodiments, a location of firearm 162 and/or feature/s of location of firearm 162 e.g. a direction in which firearm 162 is located and/or a separation of the firearm (e.g. with respect to the sensor/s and/or target) is determined. For example, using acoustic sensor signals. For example, where, in some embodiments, direction of the firearm from the acoustic sensors is determined using a determined angle of a trajectory of the shockwave. In some embodiments, additionally or alternatively to using timing of sensed shockwave/s, indication firearm 152 location feature/s are determined using a detected blast audio signal, the audio signal associated with ejection of the projectile from the firearm.

Optionally, in some embodiments, target 107 is a movable target (e.g. is moved by one or more actuator). In some embodiments, one or more sensor (e.g. accelerometer) is used in tracking of target 107. The tracking sensor data, for example, used in determining distances between acoustic sensor/s and the target e.g. as an input to determining of projectile trajectory.

FIG. 2 is a method of projectile tracking, according to some embodiments of the disclosure.

At 200, in some embodiments, pressure measurements are received with time. For example, as measured by one or more sensor (e.g. one or more of sensors 104, 106, 108, FIG. 1A and/or FIG. 1B).

At 202, in some embodiments, one or more supersonic shockwave signature of a supersonically moving object, also herein termed "projectile" (e.g. bullet) is identified in the pressure measurements.

At 204, in some embodiments, one or more reflected pressure wave signature from a reflecting object is identified in the pressure measurements.

In some embodiments, arrival of a shockwave is identified as a rapid, high magnitude change in air pressure. Where, in some embodiments, a rapid high magnitude increase in air pressure is followed by a rapid high magnitude reduction in air pressure. For example, the increase in air pressure followed by reduction having a characteristic "n-shape".

In some embodiments, the changes are larger than ambient noise and/or occur more rapidly than fluctuations in pressure associated with noise.

Where, in some embodiments, identification of arrival of a shockwave is by monitoring acoustic sensor measurements, and comparing measured changes in air pressure with time with one or more threshold.

For example, where a change in pressure with time (rise and/or decrease) is characterized as a shockwave when one or more feature of the pressure measurement is over a threshold. For example, where one or more of:

Change in measured pressure is by over a threshold increase in magnitude. Where, in some embodiments, the threshold increase in magnitude is determined in calibration measurements e.g. measurements performed on a system and used for other systems. In an exemplary embodiment, the threshold increase in magnitude is 50-200 decibels, or 100-150 decibels, or about 125 decibels, or lower, or higher or intermediate ranges, or magnitudes.

Change in measured pressure is by over a threshold increase in magnitude over a set amount of time. Where, in some embodiments, arrival of a shockwave is identified as a change in pressure magnitude (e.g. as quantified for the threshold increase of magnitude above) over less than 0.1 ns-10 μs, or 0.5-5 μs, 0.5-2 μs or about 1 μs, or lower, or higher, or intermediate durations or ranges. A slope (first differential with time) of the pressure measurement signal is above a threshold.

A change in a differential (and/or a second differential) of the measured pressure is over a threshold.

In some embodiments, more than one feature of the pressure measurement (e.g. of the thresholds) are used to characterize a change in pressure as arrival of a shockwave. For example, where more than one of the above list of features indicates a shockwave. Where, in some embodiments, in characterizing the portion of the pressure measurement signal, different threshold/s have different weights.

In some embodiments, once a magnitude of the pressure measurement signal is over a threshold and a magnitude of a differential of the pressure measurement signal is above a threshold, a maximum of a timing of a second derivative of the measurement signal is used as timing of arrival of the shockwave.

In some embodiments, variations in pressure in a time window after identifying a shockwave are disregarded. A potential advantage being reduction of false positive shockwave detection associated with sensor saturation and/or oscillation and/or system vibration/s associated with shockwave arrival. Where, in some embodiments, the window is of an extent less than a minimum expected time to arrival of reflected shockwave/s.

Regarding determining a time of arrival of a shockwave, in some embodiments, a time of a pressure peak is used. In some embodiments, a time of a pressure minimum is used). In some embodiments, a time of rise in pressure to the peak is used.

In some embodiments, a reflected shockwave is characterized as such by temporal proximity to a directly sensed shockwave. For example where a difference in time of arrival of the two shockwaves is below and/or above a threshold (e.g. within a time window). Alternatively or additionally, in some embodiments, a reflected shockwave is characterized as such by a reduced magnitude e.g. as compared to the directly sensed shockwave.

Regarding determining a difference in time of arrival of a direct shockwave and a reflected shockwave to a single sensor, in some embodiments, times of pressure peaks and/or minimums are used. In some embodiments, cross correlation between at least a portion (e.g. all of) the n-shaped pressure wave is used. In an exemplary embodiment, rises in pressure to the peaks are used.

In some embodiments, a difference in time of arrival between shockwaves (e.g. of a same measurement signal and/or of different measurement signals) is determined. Where, in some embodiments, the time difference is determined identifying timing of shockwave arrival (e.g. as described above) for each shockwave.

Alternatively or additionally, in some embodiments, cross-correlation of shockwave measurement signals (e.g. the n-shaped characteristic shockwave signal of typical duration of 100-500 µs, or about 300 µs) for multiple measured shockwaves is used to determine time between arrival of the shockwaves.

At 206, in some embodiments, at least a portion of a trajectory of the moving object is determined using timing of identified pressure wave signatures. In some embodiments, known position of sensor/s (e.g. with respect to each other and/or with respect to one or more acoustically reflective surface) acquiring the pressure measurements is used in determining the trajectory.

In some embodiments, using identified arrival in time of the shockwave to each sensor, including virtual sensors, a form of the conical shaped shockwave is determined. Including the angle of opening of the cone (Mach number) and/or trajectory of the conical shockwave to provide, in some embodiments, trajectory of the projectile.

For example, by modeling the projectile using simultaneous equations for movement of the shockwave and/or projectile through space.

For example, using one or more model of the art where virtual sensors are treated as real sensors, in use of the model.

For example, using a model including one or more feature as described in the reference which is herein incorporated by reference into this document in its entirety: N. Levanon, "Acoustic hit indicator," in IEEE Transactions on Aerospace and Electronic Systems, vol. 37, no. 1, pp. 304-309, January 2001, doi: 10.1109/7.913692. Specifically, in the section starting column 2 page 305 and entitled "TOA EQUATIONS FOR A PERPENDICULAR HIT" continuing inclusively through page 306 until line 13 column 2 page 307.

For example using a model including one or more feature as described in U.S. Pat. No. 4,261,579 which is herein incorporated by reference in its entirety. Specifically, for example, in this reference from column 4 line 27 starting "To facilitate an understanding of the invention the following description commences with a mathematical description of the shock wave generated by a supersonic projectile such as a bullet." Continuing inclusively through columns 5, 6, 7, and 8 of the reference and concluding with: "From the above mathematical analysis it will be appreciated that when a conically expanding shock wave as generated by a supersonic projectile is detected by a plurality of spaced sensors, and the time of detection at each sensor is measured, assuming that a sufficient number of sensors is provided, a number of simultaneous equations may be solved which provides the co-ordinates of the hit position of the bullet as it passes through a predetermined target plane. It has been proposed to provide an arrangement for determining the position that a bullet impinges on a target in which an array of transducers is provided beneath and slightly in front of the target to detect the conical pressure or shock wave, each transducer of the transducer array being associated with a timing device adapted to provide an indication of the precise instant at which the pressure or shock wave is detected by each transducer, a computer being provided to perform the necessary calculations to solve the simultaneous equations to provide an indication of the bullet hit position."

Figure 3A:
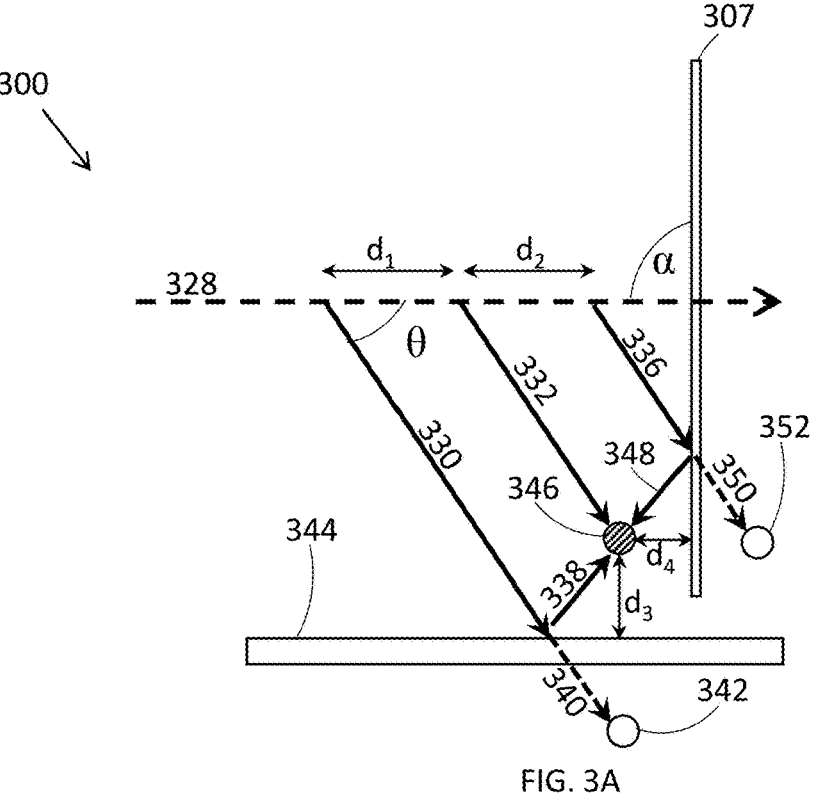
FIG. 3A is a simplified schematic of a projectile tracking system, according to some embodiments of the disclosure.

FIG. 3A is a simplified schematic of a projectile tracking system 300, according to some embodiments of the disclosure.

In some embodiments, system 300 includes one or more feature as illustrated in and/or described regarding system 100 FIG. 1A and/or FIG. 1B.

In some embodiments, system 300 includes a first reflective surface 307 and a second reflective surface 344.

In some embodiments, first reflective surface 307 is a target. In some embodiments, second reflective surface 344 is a ground surface. For example, where ground surface 344 is sufficiently rigid and/or planar e.g. for a reflected shockwave to be identified from sensor measurement. In some embodiments, second reflective surface 344 is a component of system 300.

In some embodiments, system 300 includes an acoustic sensor 346. Where, in some embodiments, system 300 includes additional non-illustrated sensor/s.

FIG. 3A, in some embodiments, illustrates an exemplary projectile path along arrow 328. Where the projectile, for example, intercepts (and optionally passes through) a plane of target 307.

Where, for supersonic projectile movement along path 328, sequential paths of a shockwave generated are illustrated by dashed lines 330, 332, 336. For example, where a conical shockwave moves with the projectile. An angle of opening of the cone (e.g. θ, is related to the "Mach angle" where; θ=90°−Mach angle) and depends on speed of the projectile. Although the shockwave, in some embodiments, moves continuously with movement of the projectile, FIG. 3A, for clarity, illustrates the shockwave at discrete times where, for simplicity of discussion, the shockwave at different times is named successively "first shockwave" "second shockwave" "third shockwave".

In some embodiments, a first shockwave 330 is reflected from second reflective surface 344, being directed to sensor 346 along path 338. In some embodiments, a second shockwave 332 is directly sensed by sensor 346. In some embodiments, a third shockwave 336 is reflected from first reflective surface 307, being directed to sensor 346 along path 348.

In some embodiments, reflection of the shockwave and subsequent sensing at sensor 346 generates virtual sensor/s 342, 352. Where first virtual sensor 342 is generated by reflection by surface 340 and second virtual sensor 352 is generated by sensed reflection at surface 307.

Where, generally, a virtual sensor associated with a sensor separated from a reflective surface, is located "behind" the reflective surface at a same distance from the reflective surface as the sensor is from the reflective surface, the virtual sensor being a "reflection" of the sensor the acoustically reflective surface analogously acting as a mirror surface.

In some embodiments, sensing of reflected shockwave/s (also herein termed "virtual sensing") is used where sensed direct shockwaves and reflected shockwaves are sufficiently spaced in time in sensor data to be identified separately.

In some embodiments, temporal separation of sensed shockwaves depends on the length of paths of the shockwave to the sensor and a speed of movement of the projectile.

In connection to this, FIG. 3A (e.g. along with FIG. 3B introduced below), in some embodiments, is used to understand limiting situations for when it is possible to use virtual sensing in a real system, where, for example, sensor 346 has a relaxation time.

Figure 3B:
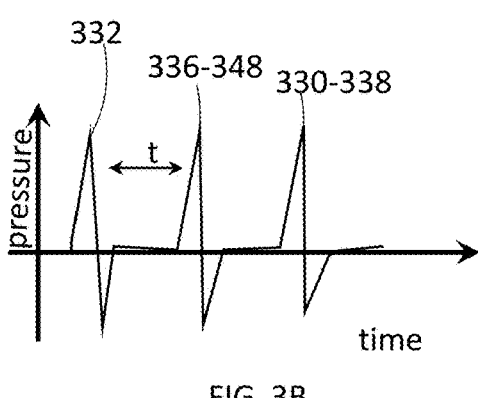
FIG. 3B is a simplified schematic of acoustic sensor measurement, according to some embodiments of the disclosure.

FIG. 3B is a simplified schematic of acoustic sensor measurement, according to some embodiments of the disclosure.

In some embodiments, FIG. 3B illustrates pressure peaks 332, 330-338, 336 measured by sensor 346. Where in FIG. 3, pressure peaks 332, 330-338, 336 correspond to measurement of the pressure shockwave along the paths numbered as such in FIG. 3A.

Pressure peaks 332, 330-338 in FIG. 3A, illustrate an embodiment where a reflected shockwave 330-338 arrives later than a direct shockwave 332:

$$\frac{d_{330} + d_{338}}{C} > \frac{d_1}{V} + \frac{d_{332}}{C} \qquad \text{Equation 1}$$

Where: $d_{330}$, $d_{338}$, $d_{332}$ are distances along path 330, path 338, path 332 respectively, C is the speed of sound, length $d_1$ is illustrated in FIG. 3A, a distance of movement of the projectile from where the pressure wave path 330 starts to where pressure wave path 332 starts, V is a speed of movement of the projectile along path 328 (or at least portion $d_1$ of path 328).

For both the direct shockwave and the reflected shockwave to be identified from measurement at a single sensor, in some embodiments, time between arrival of the direct and reflected shockwave is at least the relaxation time of the sensor.

In embodiments where projectile velocity is much higher than the speed of sound, a distance $d_3$ of sensor 346 to reflective surface 344 dominates this time difference e.g. as a difference in path lengths at the speed of sound for the shockwave to be travel is, at the least (allowing θ to vary for different speed projectiles e.g., to a maximum of 90°) is double $d_3$.

Now referring to reflective surface 307, to prevent temporal overlap (and/or spacing which is too close for shockwave identification from sensor data) of direct shockwave 332 and reflected shockwave along path 336-348. In some embodiments, projectile speed of the projectile moving along path d2 is sufficiently high that the time difference between sensing of shockwave 332 and reflected shockwave 336-438 is dominated by difference in path length of the shockwaves at the speed of sound. So that, to identify both shockwaves from sensor 346 signal, path 348 is sufficiently long. Which, is geometrically limited by distance $d_4$ e.g. as explained regarding FIG. 4.

Figure 4:
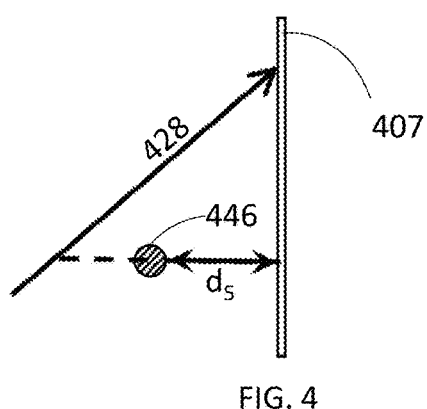
FIG. 4 is a simplified schematic illustrating shockwave sensing, according to some embodiments of the disclosure.

FIG. 4 is a simplified schematic illustrating shockwave sensing, according to some embodiments of the disclosure.

FIG. 4 illustrates exemplary shockwave sensing, which, in some embodiments, is used to select distance between a sensor 446 and a reflective surface 407. For example, to avoid temporal overlap between a sensed shockwave and its reflection.

FIG. 4 illustrates an exemplary situation where a projectile path 428 and an angle of the shockwave with respect to reflective surface 407 results in a minimal distance $d_5$ for the reflected shockwave to travel before being re-sensed at sensor 446. For example, where the reflected shockwave is perpendicular to the reflective surface 407. As shockwaves move at the speed of sound, in some embodiments, the situation illustrated in FIG. 3A is used to select a minimum $d_4$ spacing between one or more sensor 407 of a projectile tracking system and/or device according to one or more embodiments of this disclosure. The distance $2d_4/C$ in some embodiments, where C is the speed of sound, being at least the relaxation time of the sensor.

Figure 5A:
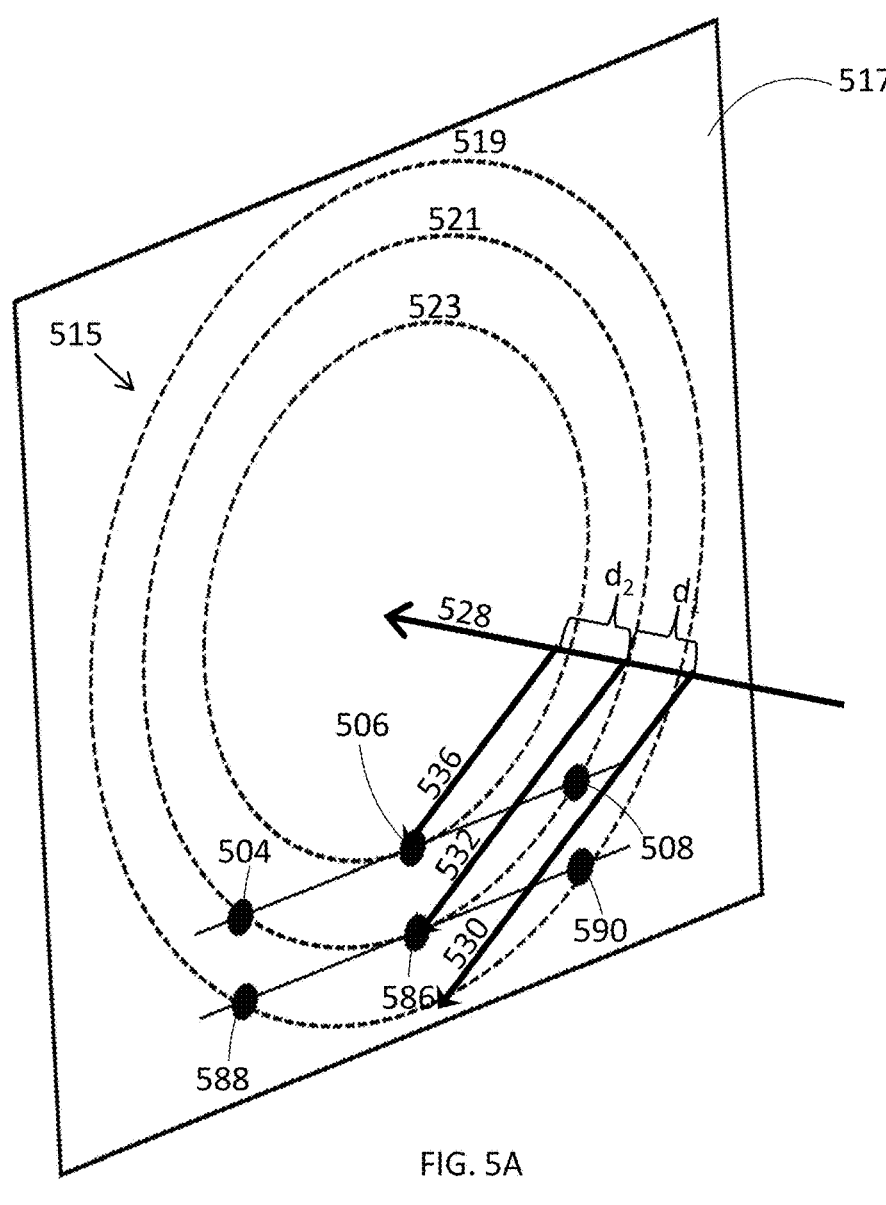
FIG. 5A is a simplified schematic of a projectile tracking system, according to some embodiments of the disclosure.

FIG. 5A is a simplified schematic of a projectile tracking system 500, according to some embodiments of the disclosure.

FIG. 5A, in some embodiments, illustrates different positioning of acoustic sensors 504, 506, 508, 586, 588, 590 with respect to a projectile trajectory 528

FIG. 5A, in some embodiments, illustrates sequential arrival of shockwaves at a plane 517. Where the shockwave arrival at different discrete times is illustrated as dashed concentric circles 515; a first shockwave 519 arrives at plane 517 first, followed by second 521 and third 513 shockwaves respectively.

As sensors 504, 506, 508, 586, 588, 590 are located in plane 517 illustrated shockwaves 515 illustrating timing of sensing of shockwaves at the sensors.

Where, for sensors closer to a path 528 of a projectile to be tracked, accuracy of tracking is higher. Where, in some embodiments, accuracy of trajectory tracking using sensors 504, 506, 508 (e.g. and not sensors 588, 586, 590) is higher than that using sensors 588, 586, 590 (e.g. and not 504, 506, 508).

Without wanting to be bound by theory, nearer sensors are able to track position of the projectile more accurately as a time difference between shockwave arrival at closer sensors is smaller, where acoustic path length difference is less (path length difference between path 536 and path 532 is less than path length difference between path 532 and 530). Where, given a supersonic projectile path 528, the shockwave with a shorter acoustic path length (e.g. 536 as opposed to path 532) arrives first.

FIG. 5A also visually illustrates advantages of placing sensors further apart from each other, as timing between sensed shockwaves increases with distance.

Given the above, placing of system sensors as close as possible to projectile trajectories is preferable, e.g. once the sensors are positioned sufficiently far away from likely projectile paths as to avoid collision of a projectile with a sensor.

Figure 5B:
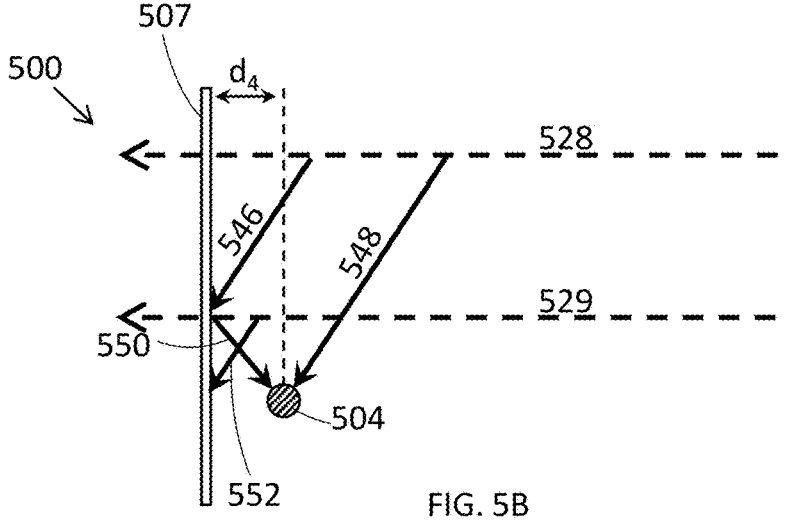
FIG. 5B is a simplified schematic of a projectile tracking system, according to some embodiments of the disclosure.

However, in some embodiments, for effective sensing of reflected acoustic signals, positioning of sensors at a distance away from projectile paths, is desirable. FIG. 5B is a simplified schematic of a projectile tracking system 500, according to some embodiments of the disclosure.

FIG. 5B, in some embodiments, illustrates two different projectile paths 528, 529. Where a first projectile path 528 is further away from a sensor 504 than a second projectile path 529. With first projectile path 528 sensor 504 senses both arrival of a direct shockwave along path 548 and a shockwave reflected from an acoustically reflective surface 507 along path 550. Whereas, second projectile path 529 and shockwave path 552 illustrate that sensor 504 is unable to sense a shockwave associated with projectile path 529 reflected from reflected surface 507. This issue could be resolved by decreasing a distance $d_4$ between sensor 504 and acoustically reflective surface 507.

Figure 6A:
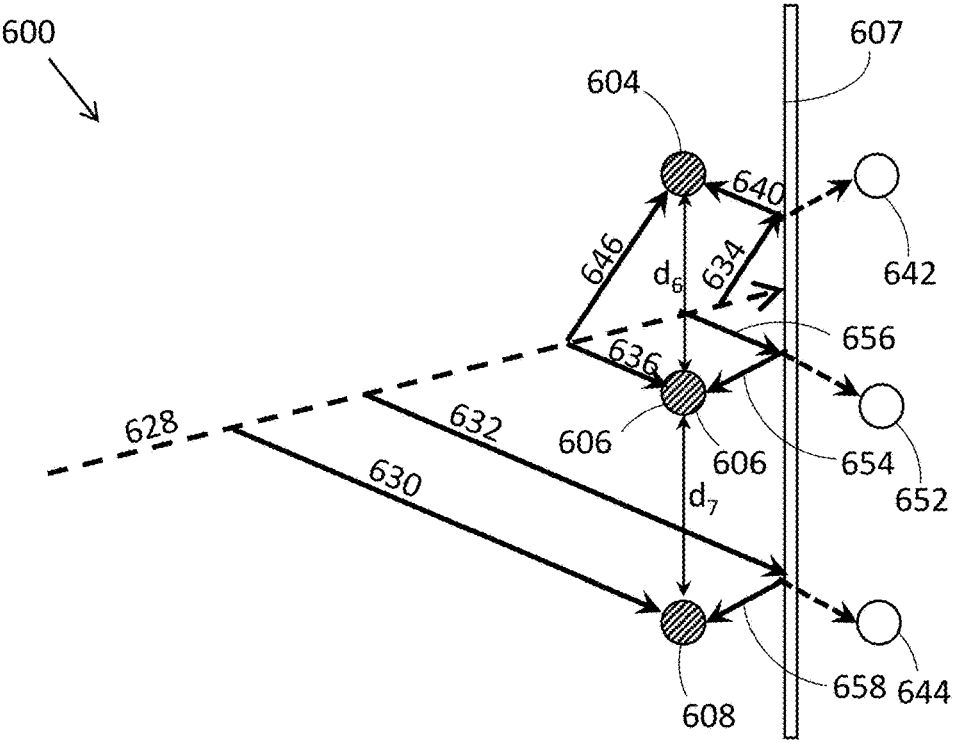
FIG. 6A is a simplified schematic illustrating shockwave sensing, according to some embodiments of the disclosure.

FIG. 6A is a is a simplified schematic illustrating shockwave sensing, according to some embodiments of the disclosure.

Figure 6B:
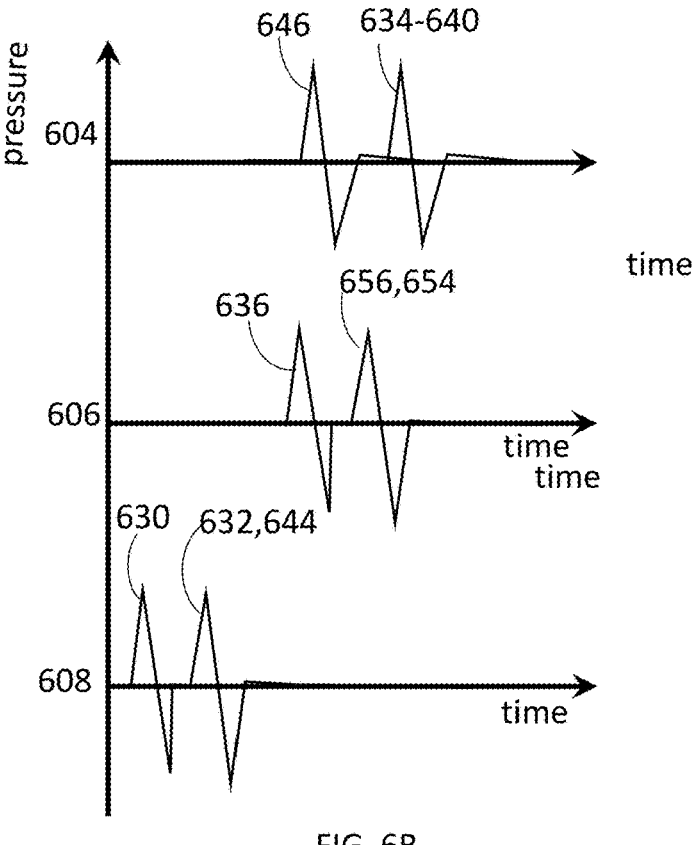
FIG. 6B is a simplified schematic of acoustic sensor measurement, according to some embodiments of the disclosure.

FIG. 6B is a simplified schematic of acoustic sensor measurement, according to some embodiments of the disclosure.

In some embodiments, FIG. 6A illustrates exemplary sensing of a projectile (which moves along a path 628) shockwave sequentially by sensors 608, 606, 604 e.g. as illustrated by shockwave acoustic paths 630, 632, 636 to the respective sensors 608, 606, 604.

In some embodiments, FIG. 6A also illustrates a system 600 where an acoustically reflective surface 607 (which in some embodiments is a target) provides virtual sensors 644, 652, 642, associated with real sensors 608, 606, 604 respectively. Where, in the exemplary embodiment illustrated in FIG. 6A, each real sensor 608, 606, 604 senses a shockwave reflection respectively along paths 632-658, 656-654, 634-640.

Figure 7:
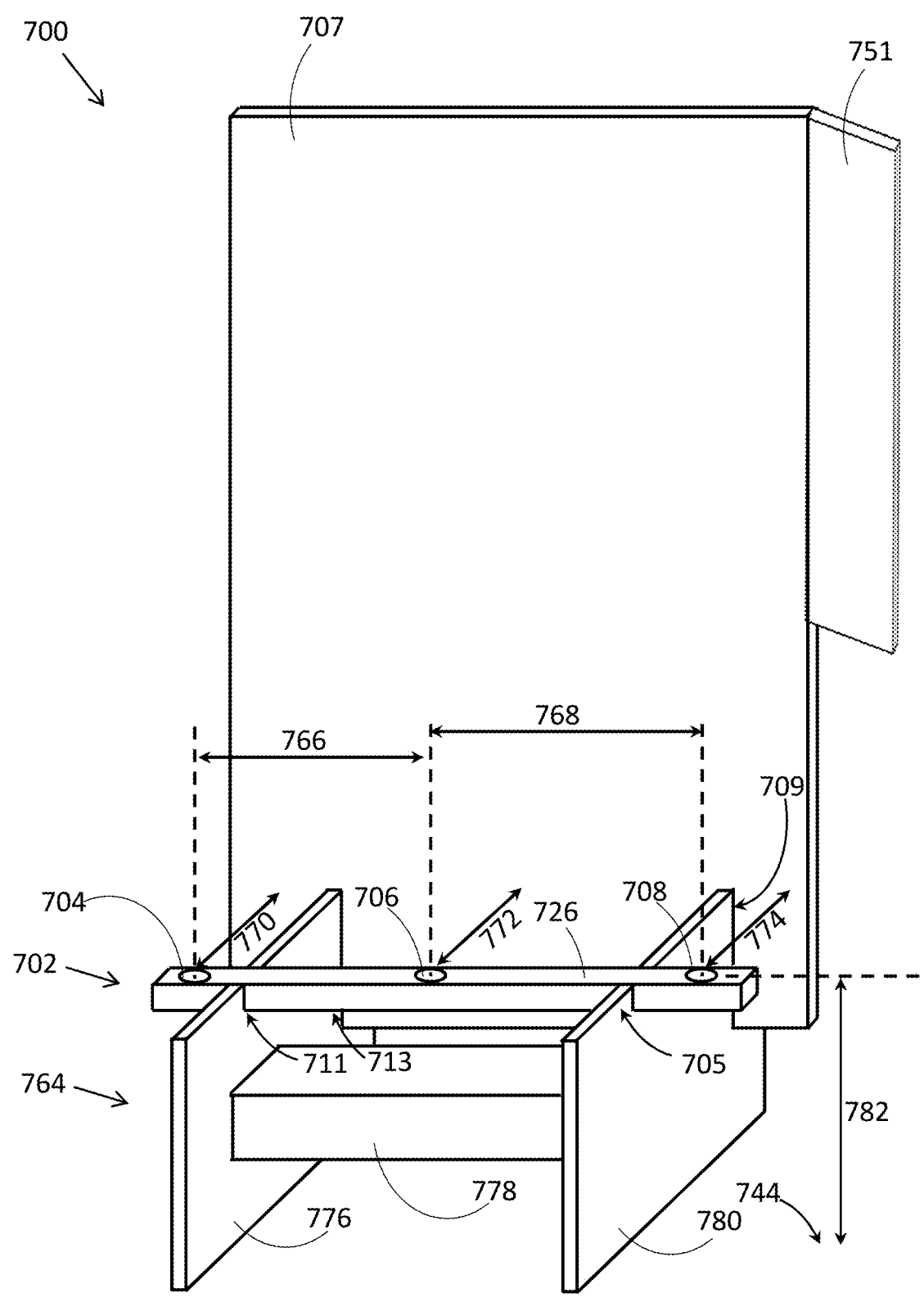
FIG. 7 is a simplified schematic of a projectile tracking system, according to some embodiments of the disclosure.

In some embodiments, FIG. 6A illustrates a top view of a system e.g. sensors 608, 606, 604 corresponding to sensors 104, 106, 108 FIG. 1A and/or sensors 708, 706, 704 FIG. 7. In some embodiments, projectile trajectory 628 is above the sensors e.g. and the shockwave paths are as illustrated but angled into a plane of the page.

In some embodiments, FIG. 6A illustrates a side view of a system where sensors are arranged stacked on top of each other where e.g. target 607 is orientated extending generally vertically.

Referring now to FIG. 6B which illustrates plots of pressure with time for measurements of sensors 604, 606, 608. In some embodiments, spacing of sensors 608, 606, 604 from acoustically reflective surface 607 is sufficient to identify separately the direct shockwaves along paths 630, 636, 646, respectively from the reflected shockwaves along paths 632-658, 656-654, 634-640, respectively from sensor measurement signals.

Although sensors 608, 606, 604 are illustrated as being equidistant from acoustically reflective surface 607 it should be understood that other arrangements are envisioned and encompassed. For example, where a linear arrangement of sensors is orientated at an angle to the reflective surface 607. For example, where sensors are not arranged linearly e.g. triangular shape e.g. curved shape.

In some embodiments, one or more of sensors 604, 606, 608 is separated from adjacent sensor/s by a distance $d_6$, $d_7$. Where, in some embodiments, the sensors are equally spaced from each other, $d_6=d_7$ (e.g. a spaced apart in a top view where FIG. 6A illustrates a top view). The reader is directed to text above associated with description of FIGS. 5A-B regarding selection of spacing between sensors e.g. selection of $d_6$ and/or $d_7$.

FIG. 7 is a simplified schematic of a projectile tracking system, according to some embodiments of the disclosure.

In some embodiments, system 700 includes a tracking device 702. Where, in some embodiments, tracking device 702 includes one or more feature as illustrated and/or described regarding tracking device 102 FIG. 1A and/or FIG. 1B.

In some embodiments, system 700 includes one or more acoustically reflective surface 706. Where, in some embodiments, acoustically reflective surface 706 is a target. In some embodiments, acoustically reflective surface 706 includes material sufficiently rigid and/or planar to reflect acoustic shockwaves (e.g. in a predictable way e.g. without high levels of scattering). For example, in some embodiments, acoustically reflective surface 706 includes cardboard and/or plastic and/or wood. In some embodiments, reflective surface 760 is a thin planar structure e.g. formed by a sheet of material. In some embodiments, acoustically reflective surface 706 is smooth and/or flat e.g. sufficiently to reflect projectile shockwaves. For example, smooth and/or flat defined as the surface (entire surface or at least 50% of the surface) deviating from planar by at most 5 mm, or 4 mm, or 1 mm, or lower, or higher, or intermediate deviations or ranges. For example, smooth and/or flat defined as 1-20 cm 2 of the surface from planar by at most 3 mm, or at most 1 mm, or lower, or higher, or intermediate deviations or ranges.

In some embodiments, system 700 includes a stand 764. Where, in some embodiments, stand provides mechanical support for tracking device and/or target 706.

For example, in an exemplary embodiment, stand 764 holds tracking device 702 and/or target 706 in known spatial relationships with each other. Additionally or alternatively, in some embodiments, stand 764 holds tracking device in a known spatial relationship with one or more additional reflective surface e.g. ground surface 744 e.g. one or more other reflective surface 751 (and/or one or more other reflective surface not illustrated).

In some embodiments, system 700 includes one or more acoustically reflective surface element e.g. in addition to target 707. In some embodiments, for example, as illustrated in FIG. 7, an acoustically reflective surface 751 is attached to and/or part of target element 707. In some embodiments, acoustically reflective surface 751 is fixed into position e.g. a known position e.g. with respect to sensor/s of device 702.

In some embodiments, stand 764 holds tracking device away from potential source/s of noise. For example, where ground surface 784 is not used as a reflective surface, in some embodiments, device 702 is held a height 782 above ground surface 784.

In some embodiments, stand 764 includes one or more feet 776, 780.

In some embodiments, feet 776, 780 are connected by one or more connector 778.

In some embodiments, stand 764 holds device 702 within inlets 705, 711 in stand 764 structure. Where, in some embodiments, stand feet 776, 780 host inlets 705, 711. In some embodiments, device housing 726, alternatively or additionally to stand inlets, includes inlets 705, 711. Where, in some embodiments stand inlets inlock with device housing inlets.

In some embodiments, stand 764 holds target 707 within inlets 709, 713 in stand 764 structure. Where, in some embodiments, stand feet 776, 780 host inlets 709, 713. In some embodiments, target 707, alternatively or additionally to stand inlets, includes inlets 709, 713. Where, in some embodiments stand inlets interlock with device housing inlets.

In some embodiments, one or both of device 702 and target 770 are removably coupled to stand 764. Where, optionally, in some embodiments, one or more connector (not illustrated) is employed to connect target 707 and/or device 702 to stand 764.

In some embodiments, target 770 is an integral part and/or fixedly attached to stand 764.

In some embodiments, stand 764 holds tracking device 702 and/or target 706 without protruding into a space between the target and one or more of (e.g. each of) the tracking device 706 sensors 704, 706, 708. A potential benefit being reduction of sensor signal noise e.g. associated with shockwave reflection at object/s other than desired object/s e.g. target 706.

In some embodiments, stand 764 is configured to hold device 702 in a plurality of positions e.g. for different system configurations.

Where, in some embodiments, device 702 is positioned closer to target 770 for sensing of slower projectiles and further away from the target for faster projectiles.

Figure 8:
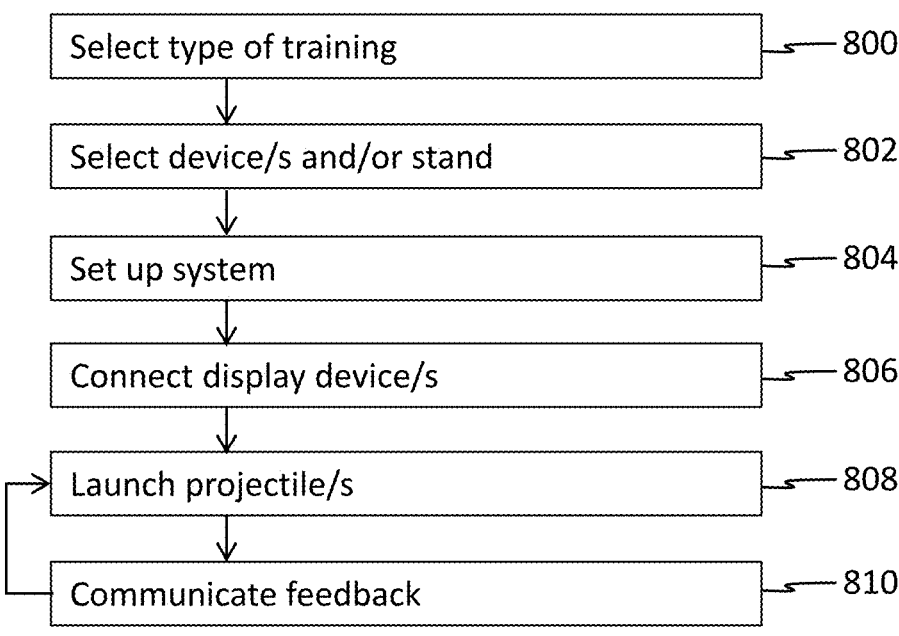
FIG. 8 is a method of marksmanship training, according to some embodiments of the disclosure.

FIG. 8 is a method of marksmanship training, according to some embodiments of the disclosure.

At 800, in some embodiments, a type of training is selected.

For example, including a firearm type and/or target distance to the marksman.

For example, including a number of targets and/or a number of shooters to be trained using the targets. Where, in some embodiments, a plurality of users practice marksmanship together, physically and/or where one or more user is remote e.g. using a tracking system in a different geographical location that other user/s. Where, in some embodiments, the plurality of users have shared feedback and/or communicate together regarding marksmanship training conducted.

For example, whether training includes moving targets, and e.g. when it does include moving target/s, optionally the type of target movement is selected.

For example, including features of feedback e.g. as described regarding step 806.

For example, whether training is to increase user skill and/or to assist in weapon calibration. For example, in some embodiments, feedback is used to adjust the weapon e.g. accuracy of weapon sight/s. In some embodiments, one or more training mode is selected where training modes vary in emphasis on timing (e.g. fast shooting) and/or skill.

For example, in some embodiments, a limited timescale for shooting is communicated to a user (e.g. via a user interface). Where, in some embodiments, feedback is provided to the user regarding speed and/or accuracy.

For example, in some embodiments, a user is allowed a longer timescale (e.g. non-limited) e.g. for practicing increasing accuracy of marksmanship.

For example, a location for the training to be conducted in e.g. location of the marksman and/or target.

At 802, in some embodiments, for example, based on information at step 800, system equipment is selected. For example, including a projectile measurement device and/or stand and/or target are selected.

In some embodiments, selection is automatic, where, for example, training type information is inputted (e.g. by a user e.g. through a user interface) and a processor determines which system equipment should be used (e.g. using a look-up table). The determined system equipment, in some embodiments, being communicated to user/s e.g. through a user interface. In some embodiments, system equipment parameter/s are determined and, optionally, in some embodiments, automatically implemented. For example, where, in some embodiments, where one or more system component has an adjustable position e.g. a projectile measurement device has adjustable sensor position e.g. a projectile measurement device has adjustable position with respect to another system element (e.g. reflective surface) one or more actuator moves the system component to a determined position (e.g. upon receiving a control signal from the processor)

In some embodiments, one or more feature of selection is inputted and/or received by the system. The selection feature/s in some embodiments, used in trajectory calculating (e.g. as described regarding step 206 FIG. 6). For example, a device position (e.g. with respect to the stand) is selected/determined (e.g. from a discrete set of possible positions) and, in some embodiments then received by the system e.g. for use in trajectory calculations.

In some embodiments, a number of projectile measurement devices are selected. For example, where the selection is based on a required accuracy and/or a range over which projectile measurement to a certain accuracy is required. For example, in some embodiments, where an increased accuracy is required than that provided by a single projectile measurement device, a second measurement device is used. Where measurements from the two devices are then used.

At 804, in some embodiments, the projectile tracking system is set up. Where, in some embodiments, one or more of; one or more projectile measurement devices, one or more acoustically reflective surfaces, and a stand are positioned e.g. with respect to each other and/or with respect to a scene in which measurements are to be conducted.

Optionally, in some embodiments, one or more calibration measurement is performed. For example, to measure distance between the sensors (e.g. where a projectile measurement device to be used is adjustable e.g. expandable). For example, to measure a spatial relationship between sensor/s and the acoustically reflective surface/s.

Where, in some embodiments, calibration measurement/s include optical measurements (e.g. a user collects images/s of the sensor and/or device and/or acoustically reflective surface) e.g. with a camera of a user mobile electronic device. Where the image/s are processed to identify sensor/s and/or reflective surfaces and/or marker/s marking position of element/s to determine spatial relationships between sensor/s and/or sensor/s and reflective surface/s.

In some embodiments, one or more proximity sensors (e.g. infrared and/or ultrasound proximity sensor/s) are used to measure distance/s and/or orientation between system part/s. In some embodiments, sensors are used in calibration and/or periodic re-calibration of spatial relationship between sensor/s and/or sensor/s and reflective surface/s.

In some embodiments, for example, where reflective surface/s move (e.g. moving target/s and/or pop-up target/s) one or more sensor (e.g. including proximity sensor/s) are used to measure a dynamic spatial relationship between an acoustically reflective surface and acoustic sensor/s and/or additional acoustically reflective surface/s.

At 806, in some embodiments, one or more electronic device is data connected to the projectile measurement device/s. For example, one or more display e.g. for display of feedback to user/s. For example, in some embodiments, a user mobile electronic device (e.g. smartphone) is wired and/or wirelessly (e.g. Bluetooth, Wi-Fi, RF) connected to the projectile measurement device.

Figure 18:
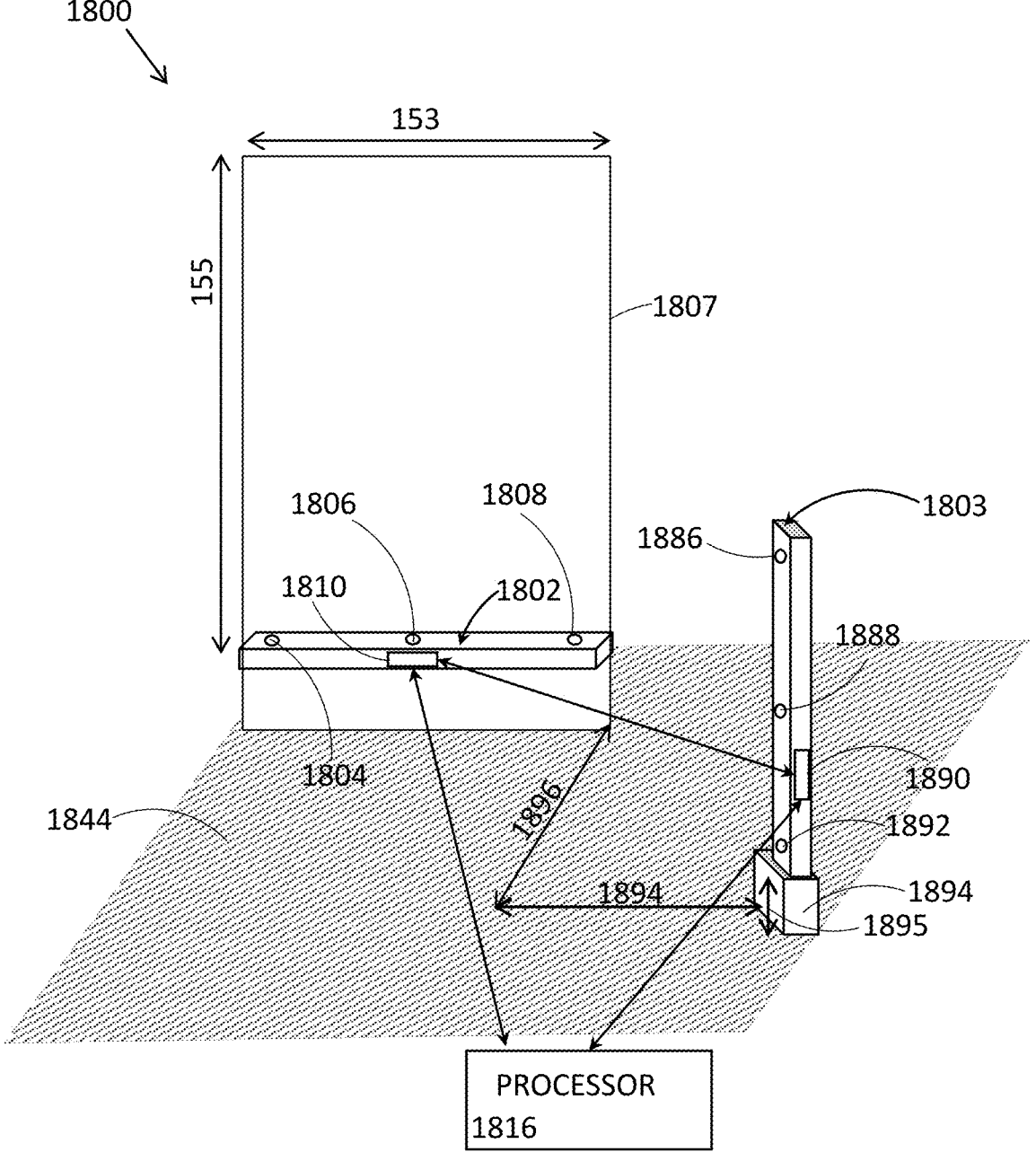
FIG. 18 is a simplified schematic of a projectile sensing system, according to some embodiments of the disclosure.

In some embodiments, a plurality of measurement devices are connected to each other, e.g. data connected, for example, as described regarding FIG. 18.

Optionally, in some embodiments, one or more of steps 800-806 are performed for a second projectile measurement system. For example, to provide concurrent projectile measurement at a plurality of systems and/or targets. Where, in some embodiments, a single user aims at a plurality of targets. Where, in some embodiments, a plurality of users aim at two or more targets (e.g. group firearms training e.g. each user aiming at their own target).

At 808, in some embodiments, projectiles are launched towards the target. By one or more users (e.g. more than one user in a group training embodiment|) and/or using one or more firearm.

At 800, in some embodiments, user/s receive feedback which is displayed on electronic device/s e.g. those connected at step 806. In some embodiments, the feedback includes a determined projectile trajectory portion/s, for one or more projectile. In some embodiments, the trajectory/ies are displayed on a rendition of the scene. Optionally, in some embodiments, training instructions are supplied, for example, generated based on the measured trajectory/ies e.g. to improve aim of the user/s.

In some embodiments, feedback is provided one or more of instantaneously and/or periodically e.g. per shot, per volley of shots, per time period.

In some embodiments, feedback includes one or more of visual, audio, and haptic feedback. In some embodiments, a graphical representation of the target is displayed to the user including an indication of determined bullet (or other ammunition round) trajectory/ies e.g. a position where the bullet hit the target (and/or passed a plane of the target) is displayed.

In some embodiments, weapon calibration is performed. For example, where user fires a plurality of times and feedback is provided to the user as to how to adjust the firearm e.g. adjustment of firearm sight/s.

Exemplary Acoustic Measurements

Measurements were acquired using a Vesper VM2020 MEMS Microphone/s.

Figure 9:
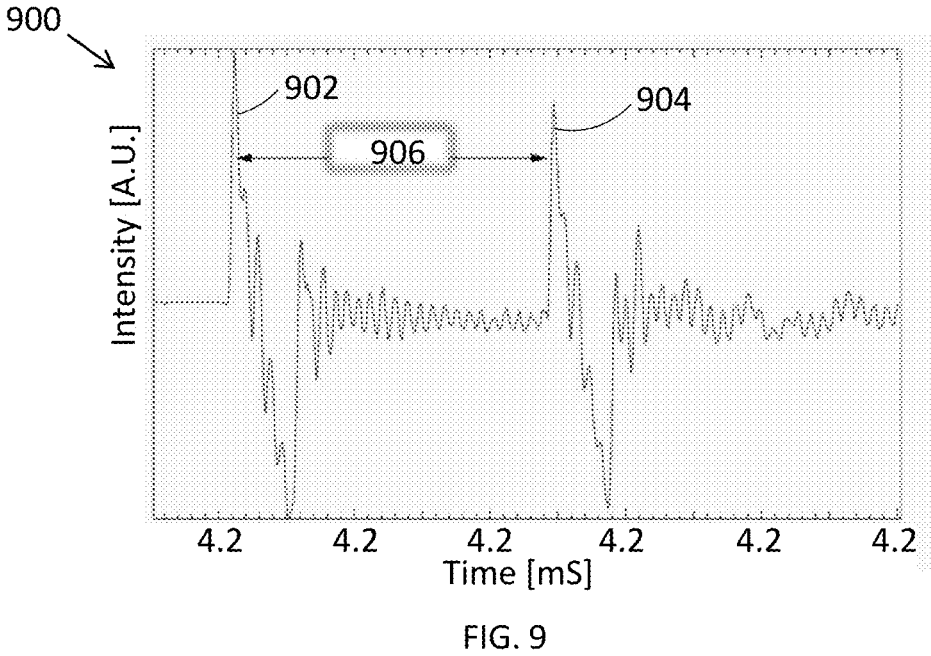
FIG. 9 is a plot of acoustic measurement with time, according to some embodiments of the disclosure.

FIG. 9 is a plot of acoustic measurement 900 with time, according to some embodiments of the disclosure.

FIG. 9 in some embodiments is a plot of an acoustic sensor measurement 900. Where the sensor was positioned about 20 cm away from an acoustically reflective surface. Where a first shockwave 902 is measured followed by sensing of a reflection 904 of the shockwave. Where time between shockwaves 906 is about 407 μs.

Using the sensor measurements, a speed of the projectile generating the shockwave is determined as double a distance between the sensor and the reflective surface divided by the time between sensed direct and reflected shockwaves:

0.4 m/0.00047 s=851 meters per second

Figures 10, 11:
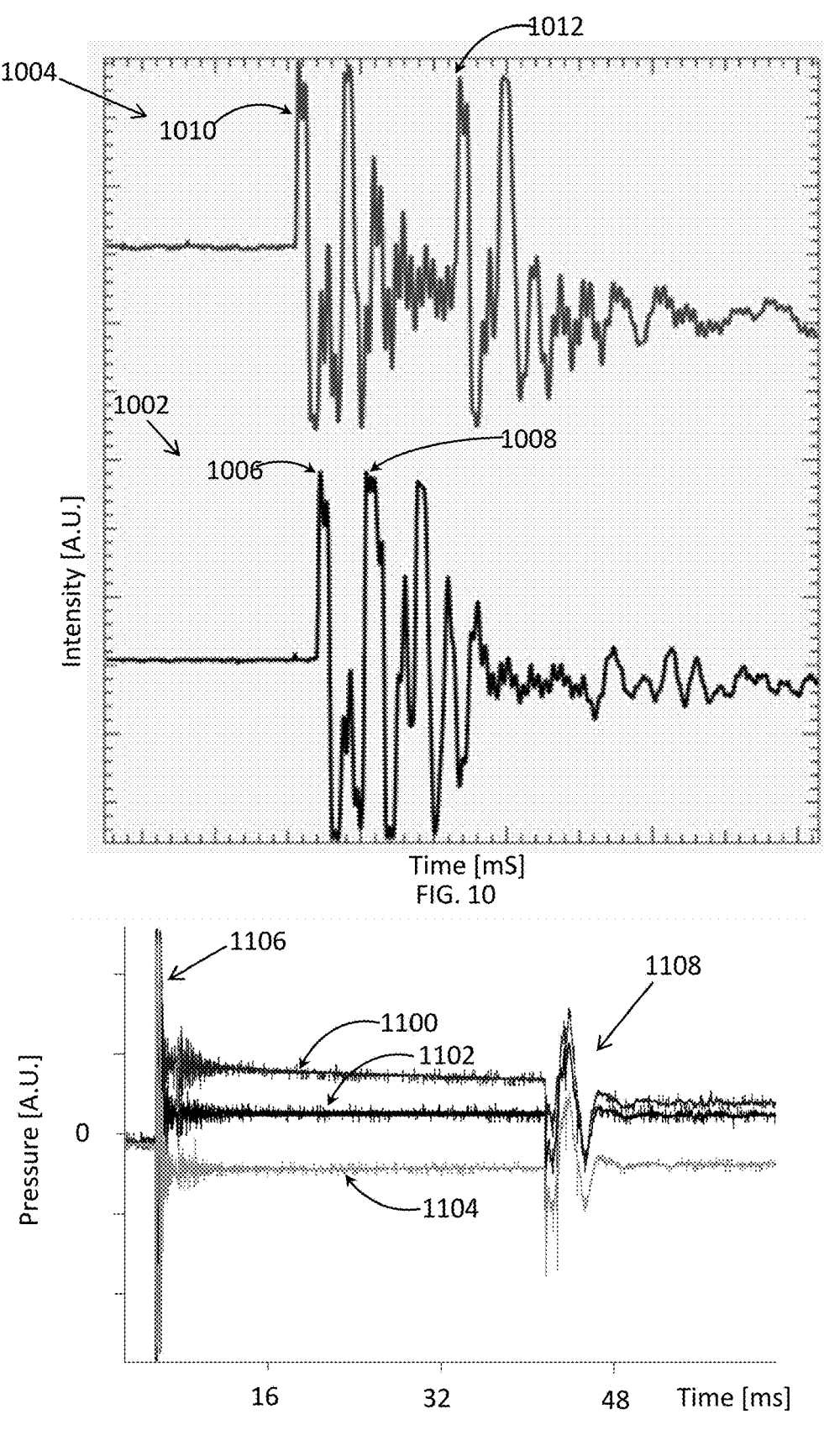
FIG. 10 is a plot of acoustic measurement with time, according to some embodiments of the disclosure.
FIG. 11 is a plot of acoustic measurements with time, according to some embodiments of the disclosure.

FIG. 10 is a plot of acoustic measurements 1002, 1004 with time, according to some embodiments of the disclosure.

Where, in some embodiments, acoustic measurement 1002 is of a projectile direct shockwave 1006 and a reflected shockwave 1008 where the sensor is separated 7 cm from an acoustically reflective surface.

Where, in some embodiments, acoustic measurement 1004 is of a projectile direct shockwave 1010 and a reflected shockwave 1012 where the sensor is separated 20 cm from an acoustically reflective surface.

Visible in the figure that, for the particular sensor used (and angle of incidence of the shockwave with respect to the sensor and acoustically reflective surface) sensor noise oscillations, in some embodiments, have reduced sufficiently for the reflected shockwave to be identified from the sensor signal at a separation of 20 cm, but not for a separation of 7 cm.

FIG. 11 is a plot of acoustic measurements 1100, 1102, 1104 with time, according to some embodiments of the disclosure.

Where, in some embodiments, measurements 1100, 1102, 1104 are each by a different acoustic sensor.

FIG. 11, in some embodiments, illustrates acoustic sensing of a projectile shockwave 1106 followed an acoustic signal of a blast 1108 associated with launch of the projectile.

Figures 12, 13:
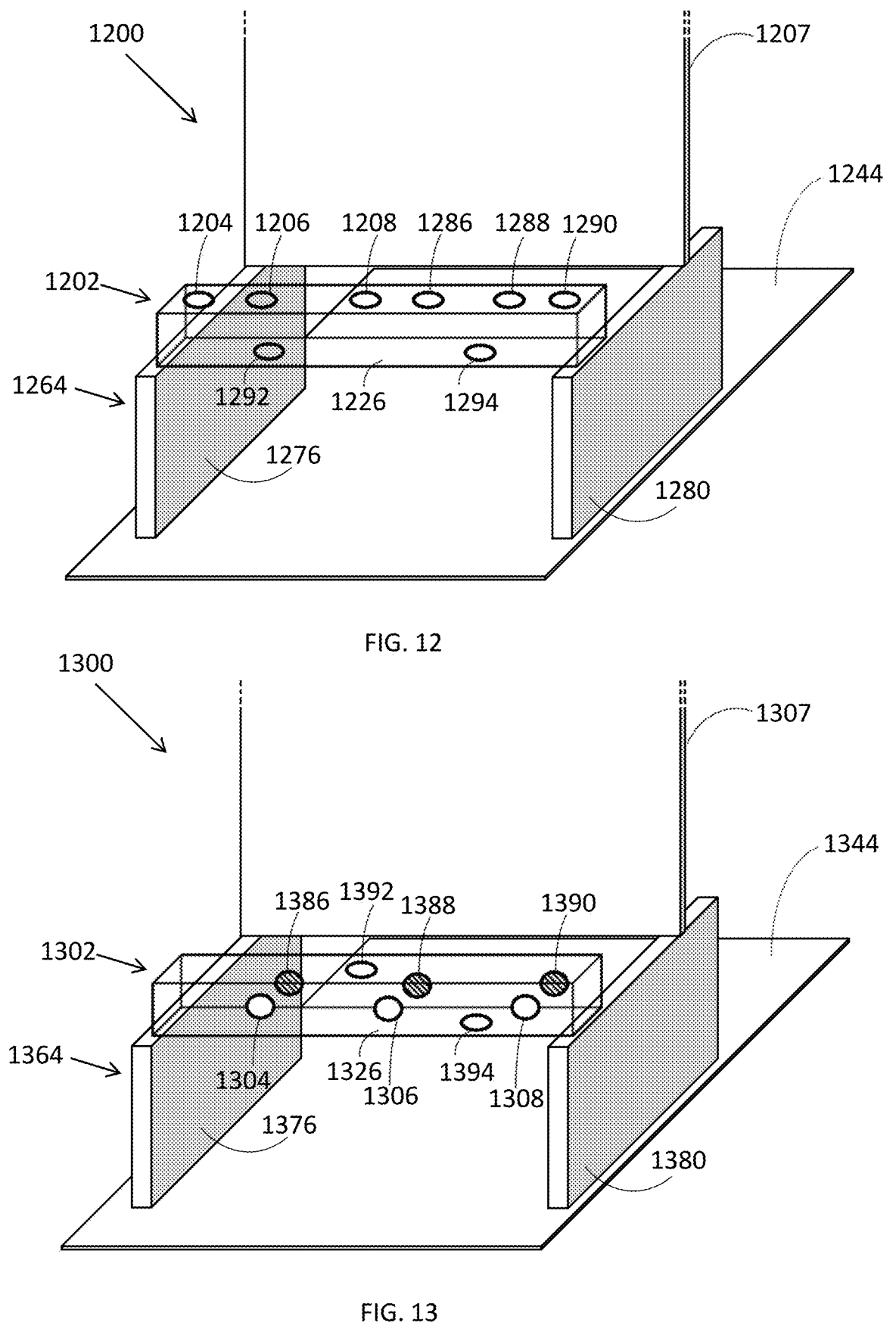

Different magnitudes of measurements related to differences between sensors (e.g. different calibration e.g. zeroing calibration) and/or sensitivity. Differences of magnitude and/or timing of arrival of the shockwave 1106 signal and/or blast signal 1108 related to different distances between the sensors and the projectile and/or launch position of the projectile Additional Exemplary Embodiments FIG. 12 is a simplified schematic of a projectile sensing system 1200, according to some embodiments of the disclosure.

In some embodiments, system 1200 includes one or more feature as illustrated in and/or described regarding system 100 FIG. 1A and/or system 100 FIG. 1B, and/or of system 300 FIG. 3A and/or system 500 FIG. 5A-B and/or of system 600 FIG. 6A and/or of system 700 FIG. 7.

In some embodiments, system 1200 includes an acoustically reflective surface 1207. In some embodiments, system 1200 includes one or more additional acoustically reflective surface 1244.

In some embodiments, system 1200 includes a stand 1264. Which, in some embodiments, positions a projectile tracking device 1202 away from one or more reflective surface 1207, 1244.

In some embodiments, projectile tracking device 1202 includes sensors which sense in a limited range of directions. For example, sensing extending away from a plane on which the sensor is located e.g. in a hemispherical shape. In some embodiments, shockwaves are sensed by sensors located on different sides of projectile tracking device 1202. For example, providing increased measurement information, e.g. for a given size device 1202. In some embodiments, sensors are disposed in a direction so that they sense the acoustic shockwave and reflections of that shockwave from an acoustically reflective surface. For example, a first set of sensors 1204, 1206, 1208, 1286, 1288, 1290 sensing reflections from a first acoustically reflective surface 1207 and a second set of sensors 1292, 1294 sensing reflections from a second acoustically reflective surface 1244.

In some embodiments, projectile tracking device 1202 includes a plurality of sensors 1204, 1206, 1208, 1286, 1288, 1290 disposed on a first surface 1291 of projectile tracking device 1202. Optionally, in some embodiments, projectile tracking device 1202 includes one or more sensor 1292, 1294 disposed on a second surface 1293 of projectile tracking device. Where, in some embodiments, surfaces 1291, 1293 are formed by a housing 1226 of projectile tracking device.

In some embodiments, surfaces 1291, 1293 are opposite sides of projectile tracking device. Where, in some embodiments, two planes describing the surfaces (e.g. best fit planes to the surfaces) and/or two planes intersecting the sensors on each of the surfaces at most 20 degrees, or at most 10 degrees, or lower, or higher, or intermediate angles, from parallel to each other.

Where, in some embodiments, projectile tracking device 1202 is positioned with respect to first reflective surface 1207 so that sensors 1204, 1206, 1208, 1286, 1288, 1290 are each separated from first reflective surface 1207.

Where, in some embodiments, projectile tracking device 1202 is positioned with respect to second reflective surface 1244 so that sensors 1292, 1226, 1294 are each separated from second reflective surface 1244.

In some embodiments, stand 1264 holds device 1202 away from both reflective surfaces 1207, 1244 without extending into a volume of space between the device and the reflective surface/s, at least in a region of sensors of the device 1202. For example, in some embodiments, stand feet 1264, 1280 are not connected in a space extending between device 1202 and reflective surface 1244 and/or reflective surface 1207.

In some embodiments, the sensors of device 1202 include sensors having different sensitivities. For example, one or more higher sensitivity sensor for sensing of blast signals at distance (e.g. more than 100 m) from the device.

FIG. 13 is a simplified schematic of a projectile sensing system 1300, according to some embodiments of the disclosure.

In some embodiments, system 1300 includes one or more sensor 1304, 1306, 1308, 1392 configured to detect directly incident acoustic signals. Where, in some embodiments, system 1300 includes one or more sensors (e.g. sensors 1304, 1306, 1308), which are configured to only detect directly incident acoustic signals. For example, are configured not to detect reflected shockwaves e.g. where shockwaves reflected from acoustically reflected surface/s are blocked e.g. by portion/s of the system and/or a geometrical region in which the sensors are able to sense is directed away from direction/s of reflected shockwaves. In an exemplary embodiment, sensors 1304, 1306, 1308 are located on a side of a body 1326 of device 1302 facing away from acoustically reflective surface 1307 e.g. an outer side of body 1326 extending away from acoustically reflective surface 1307 where body 1326 blocks reflected shockwave path to sensors 1304, 1306, 1308.

In some embodiments, system 1300 includes one or more sensor 1386, 1388, 1390 configured to detect reflected shockwaves and, for example, not to detect directly incident shockwaves. Detecting, for example, reflected shockwaves from one or more acoustically reflective surface.

Where, in some embodiments, system 1300 includes one or more sensors (e.g. sensors 1386, 1388, 1390), which are configured to only detect reflected shockwaves. For example, where direct shockwaves are blocked e.g. by portion/s of the system and/or a geometrical region in which the sensors are able to sense is directed away from direction/s of direct shockwaves. In an exemplary embodiment, sensors 1386, 1388, 1390 are located on a side of a body 1326 of device 1302 facing towards acoustically reflective surface 1307 e.g. an inner side of body 1326 where body 1326 blocks direct shockwave path to sensors 1304, 1306, 1308.

In some embodiments, one or more sensor is obscured from acoustic signals in one or more direction. For example, by additional system element/s (not illustrated) positioned shielding the sensor in one or more direction. Where the additional system element/s in some embodiments are connected to measurement device 1302.

A potential advantage of sensors sensing one of a directly incident and a reflected shockwave is an ability to sense a direct shockwave and a reflected shockwave where there is a small time separation between the shockwave detections and even when they are sensed simultaneously. Where relation time of the sensor/s does not affect the ability to separately sense a direct and reflected shockwave e.g. in a same and/or similar (e.g. 1-separation) location. Where, for example, in some embodiments, distance of a sensor sensing reflected shockwaves is not required to be sufficient for relaxation time of the sensor.

Figure 14:
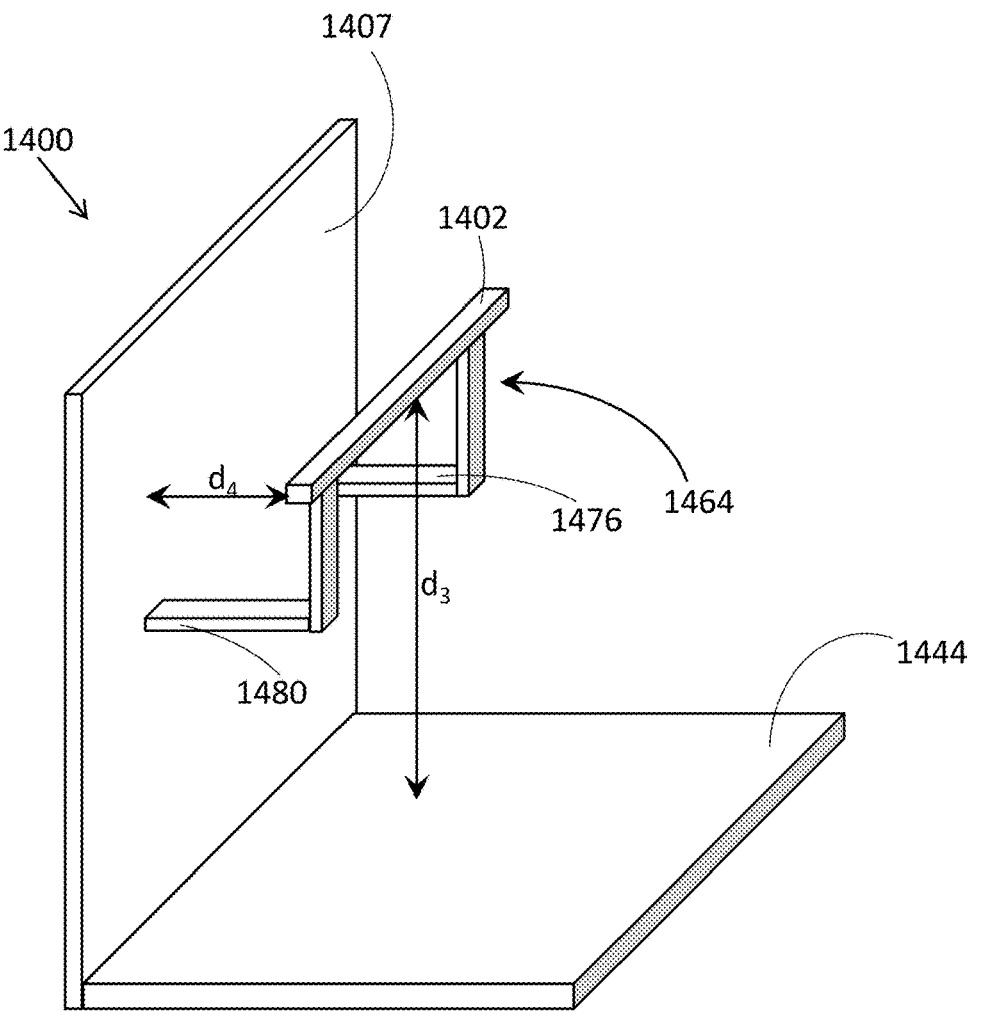
FIG. 14 is a simplified schematic of a projectile sensing system according to some embodiments of the disclosure.

FIG. 14 is a simplified schematic of a projectile sensing system 1400 according to some embodiments of the disclosure.

In some embodiments, system 1400 includes a tracking device 1402. Where, in some embodiments, tracking device 1402 includes one or more feature as illustrated and/or described regarding tracking device 102 FIG. 1A and/or FIG. 1B and/or tracking device 702 FIG. 7 and/or tracking device 1202 FIG. 12, and/or tracking device 1302 FIG. 13.

In some embodiments, system 1400 includes a stand 1464. Where, in some embodiments, stand provides mechanical support for tracking device 1402.

In some embodiments, stand 1464 is attached to one or more acoustically reflective surfaces 1407, 1444. In some embodiments, one or more of the acoustically reflective surfaces is provided by an object e.g. an external surface of an object. Where, exemplary objects include vehicles and stationary structures (e.g. buildings).

Optionally, in some embodiments, system 1400 includes one or more acoustically reflective surface which is, for example, attached to the object e.g. where object surface/s are not sufficiently acoustically reflective (suitable characteristics of acoustically reflective surface/s e.g. as described regarding acoustically reflective surface 706 FIG. 7). In some embodiments, stand 1464 holds device 1402 away from one or more acoustically reflective surface 1407, 1444 at distances $d_4$ and $d_3$ respectively e.g. according to one or more features of position of acoustic sensors of devices with respect to acoustically reflective surfaces as described elsewhere in this document.

In some embodiments, stand 1464 includes one or more arm 1476, 1480 for attachment of stand 1464 to surface 1407. In some embodiments, arms 1476, 1480 are connected by one or more connector (not illustrated). Additionally or alternatively, to arms, in some embodiments, stand 1464 includes one or more foot (not illustrated) to provide support to stand e.g. from surface 1444 (which in some embodiments is a ground surface 1444).

In some embodiments, connection and/or support of device 1402 by stand 1464 includes one or more feature as illustrated and/or described regarding device 702 and stand 764 FIG. 7 and/or device 1202 and stand 1264 FIG. 12 and/or device 1302 and stand 1364 FIG. 13.

Figure 15:
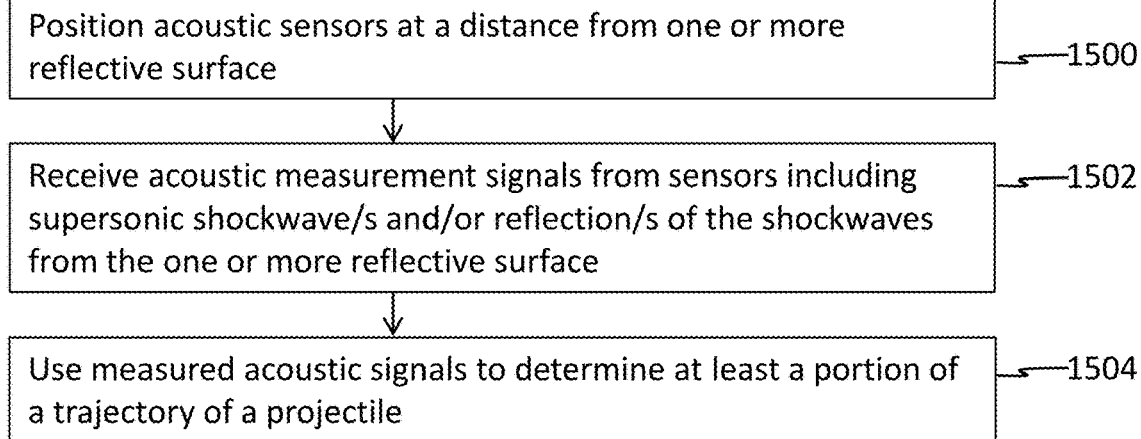
FIG. 15 is a method of projectile sensing, according to some embodiments of the disclosure.

FIG. 15 is a method of projectile sensing, according to some embodiments of the disclosure.

At 1500, in some embodiments, acoustic sensors are positioned at a distance from one or more acoustically reflective surfaces. Where, in some embodiments, an acoustically reflective surface of the one or more acoustically reflective surfaces is a surface of an object e.g. a vehicle e.g. a building. In some embodiments, acoustic sensors (e.g. of a tracking device) are attached to the object.

At 1502, in some embodiments, acoustic measurement signals from the sensors including measurement supersonic shockwave/s and reflection of the shockwave/s from the acoustically reflective surface/s.

At 1504, in some embodiments, the received acoustic measurement signals are used to determine at least a portion of a trajectory of a projectile e.g. the determining including one or more feature of step 206 FIG. 2. Where determining is, for example, of a position of projectile impact with the object and/or direction from which the projectile arrives and/or location of the projectile launch.

Figure 16:
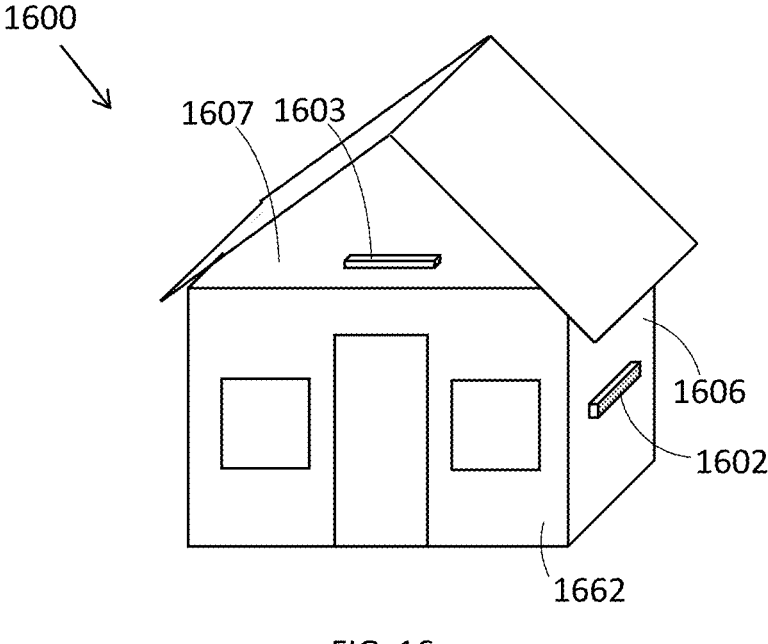
FIG. 16 is a simplified schematic of a projectile sensing system, according to some embodiments of the disclosure.

FIG. 16 is a simplified schematic of a projectile sensing system 1600, according to some embodiments of the disclosure.

In some embodiments, system 1600 includes one or more projectile sensing device 1602, 1603. Where, in some embodiments, a structure 1662 (e.g. building) to which the device/s 1602, 1603 are connected provides acoustically reflecting surfaces 1606, 1607 respectively.

Figure 17:
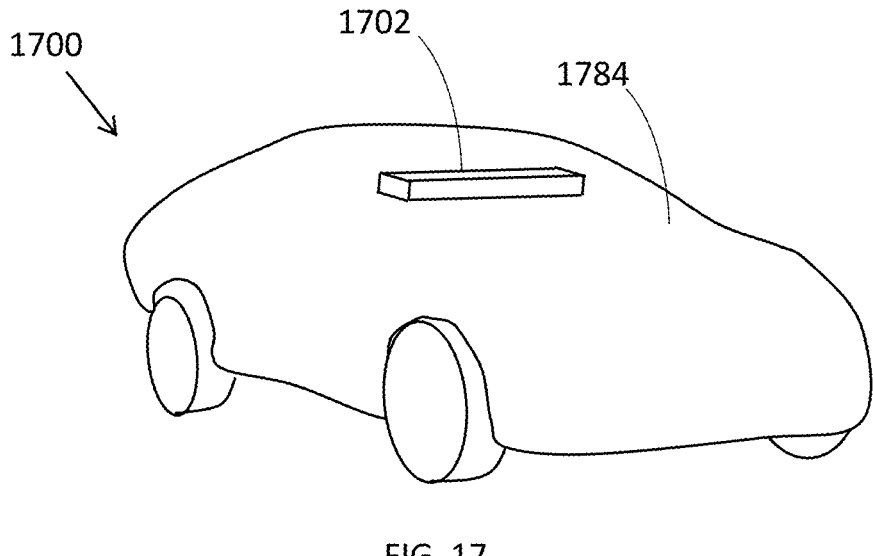
FIG. 17 is a simplified schematic of a projectile sensing system, according to some embodiments of the disclosure.

FIG. 17 is a simplified schematic of a projectile sensing system 1700, according to some embodiments of the disclosure.

In some embodiments, system 1700 includes one or more projectile sensing device 1702. Where, in some embodiments, a structure 1784 (e.g. vehicle) to which the device/s 1702 are connected provides acoustically reflecting surface/s 1784.

FIG. 18 is a simplified schematic of a projectile sensing system 1800, according to some embodiments of the disclosure.

In some embodiments, system 1800 includes a plurality of projectile sensing devices 1802, 1803. Where each projectile sensing device includes a housing, a plurality of sensors 1804, 1806, 1808, 1886, 1888, 1892, and a processor 1810, 1892.

Where, in some embodiments, a second projectile sensing device 1803 is positioned outside an expected projectile zone. For example, at a distance 1896, 1894 of at least 20 cm, or 20-500 cm, or 20-200 cm, or lower or higher or intermediate distances or ranges away from a first projectile sensing device 1802 and/or a target 1807.

First projectile sensing device 1802 and/or target 1807 each including, in some embodiments, one or more feature of projectile sensing devices and/or targets as described and/or illustrated elsewhere in this document.

In some embodiments, second projectile sensing device 1803 is positioned vertically where sensors 1892, 1888, 1886 and/or a second projectile sensing device elongate housing are aligned with a vertical axis and/or are orientated at an angle between degrees of a surface 1844 on which the system is positioned.

A potential advantage of such orientation of the second projectile sensing device is the ability to increase vertical accuracy of projectile tracking, for example, while having minimal risk of being impacted by a projectile.

Optionally, in some embodiments, second projectile sensing device 1803 is supported by a stand 1894. Where second projectile sensing device 1803 is positioned at a height 1895 above surface 1844.

In some embodiments, system 1800 is a modular system including the ability to use a plurality of projectile sensing devices 1802, 1803 in projectile sensing. Where, for example, depending on a tracking accuracy and/or a size and/or shape of a required tracking region, a number of projectile sensing devices are selected and positioned.

In some embodiments, the selected plurality of projectile sensing devices 1802, 1803 are each data connected to an external processor 1816 (and therefrom, for example, to a user interface e.g. processor 1816 including one or more feature of processor 116 FIG. 1A). Where processor 1816, in some embodiments, uses measurement data provided by the plurality of projectile sensing devices to determine projectile trajectory/ies. Alternatively or additionally to connection to external processor 1816, in some embodiments, processors 1810, 1890 of the projectile sensing devices are connected. For example, for temporal co-ordination of sensing with the device potentially increasing tracking accuracy.

General

It is expected that during the life of a patent maturing from this application many relevant firearms and/or projectile tracking systems will be developed and the scope of the terms firearm and/or projectile tracking system are intended to include all such new technologies a priori.

As used herein the term "about" refers to ±20%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

The invention claimed is:

1. A projectile tracking system comprising:
a plurality of acoustic sensors rigidly held apart from each other and each acoustic sensor of the plurality of acoustic sensors is held apart from an acoustically reflective surface by a respective shortest straight line distance selected so that, for the respective acoustic sensor a time between arrival of a supersonic shockwave of a projectile at the respective acoustic sensor and arrival of a reflection of said supersonic shockwave from said acoustically reflective surface at the respective acoustic sensor is at least a sensing relaxation time of the respective acoustic sensor, said respective shortest straight line distance being at least double said sensing relaxation time multiplied by a speed of sound, the sensing relaxation time defined as a time delay after sensing of a first shockwave at which a sensor is able to detect a second shockwave;

a processor configured to:

receive a spatial relationship between said plurality of acoustic sensors and a spatial relationship between said plurality of acoustic sensors and said acoustically reflective surface;

receive a plurality of measurement signals comprising a measurement signal corresponding to each of said plurality of acoustic sensors;

identify:

in at least one single measurement signal of said plurality of measurement signals, timing of arrival of a supersonic shockwave of a projectile to the respective sensor; and in said at least one single, timing of arrival of a reflection of said supersonic shockwave from said acoustically reflective surface to the respective sensor;

determine at least a portion of a trajectory of the projectile, using:

said timing of arrival of said supersonic shockwave;

said timing of arrival of said reflection;

said spatial relationship between said plurality of acoustic sensors; and said spatial relationship between said plurality of acoustic sensors and said acoustically reflective surface.

2. The system according to claim 1, wherein said acoustically reflective surface is a target.

3. The system according to claim 1, wherein said projectile is a bullet.

4. The system according to claim 1, wherein said processor is configured to:

receive a spatial relationship between said plurality of acoustic sensors and an additional acoustically reflective surface positioned away from said plurality of acoustic sensors;

identify, in said at least one single measurement signal, timing of arrival of a second reflection of said supersonic shockwave from said additional acoustically reflective surface to the respective sensor;

determine at least a portion of a trajectory of the projectile, using said timing of arrival of said second reflection; and said spatial relationship between said sensors and said additional acoustically reflective surface.

5. The system according to claim 4, wherein said plurality of acoustic sensors are each spaced apart from said additional acoustically reflective surface by a distance selected based on a sensing relaxation time of said plurality of acoustic sensors.

6. The system according to claim 1, wherein said plurality of acoustic sensors comprises three acoustic sensors and wherein said processor is configured to receive three measurement signals one from each of said three acoustic sensors.

7. The system according to claim 6, wherein said sensors are positioned so that, for a range of projectile trajectories, each of said three acoustic sensors senses said supersonic shockwave and said reflection;

wherein said processor is configured, for said range of projectile trajectories to:

identify, in each of said three sensor signals, separately identifiable timing of arrival of said supersonic shockwave and timing of arrival of said reflection in the respective sensor signal;

determine a position at which said projectile intersects with a plane of said acoustically reflective surface to an accuracy of 1 cm.

8. The projectile tracking system according to claim 7, wherein said range of trajectories includes projectiles on trajectories which hit said acoustically reflective surface.

9. The system according to claim 8, wherein said range of projectile trajectories comprises trajectories where said projectile passes through a plane of said acoustically reflective surface at a distance of less than 50 cm away from said acoustically reflective surface.

10. The system according to claim 1, wherein said plurality of acoustic sensors are hosted by a tracking device having an elongate body with a maximal extent of 30 cm perpendicular to a central longitudinal axis of said elongate device housing.

11. The system according to claim 10, wherein said maximal extent perpendicular to said central longitudinal axis of said elongate body is 10 cm.

12. The system according to claim 11, wherein a maximal extent of said elongate body is 50 cm.

13. A method of supersonic projectile tracking comprising:

receiving a plurality of measurement signals from a plurality of acoustic sensors rigidly held apart from each other, each acoustic sensor being held apart from an acoustically reflective surface by a respective shortest straight-line distance selected so that, for the respective acoustic sensor, a time between arrival of a supersonic shockwave of a projectile at the respective acoustic sensor and arrival of a reflection of said supersonic shockwave from said acoustically reflective surface at the respective acoustic sensor is at least a sensing relaxation time of the respective acoustic sensor, said respective shortest straight-line distance being at least double said sensing relaxation time multiplied by a speed of sound, the sensing relaxation time defined as a time delay after sensing of a first shockwave at which a sensor is able to detect a second shockwave;

receiving a spatial relationship between said plurality of acoustic sensors and a spatial relationship between said plurality of acoustic sensors and said acoustically reflective surface;

identifying:

in at least one single measurement signal said plurality of measurement signals, timing of arrival of a supersonic shockwave of a projectile to the respective sensor; and in said at least one single measurement signal, timing of arrival of a reflection of said supersonic shockwave from said acoustically reflective surface to the respective sensor;

determining at least a portion of a trajectory of the projectile, using:

said timing of arrival of said supersonic shockwave;

said timing of arrival of said reflection;

said known spatial relationship between said plurality of acoustic sensors; and said spatial relationship between said plurality of acoustic sensors and said acoustically reflective surface.

14. The method according to claim 13, wherein said identifying includes identifying timing of a change in pressure above a pressure threshold change.

15. The method according to claim 13, wherein said identifying includes identifying timing of a differential of pressure above a differential threshold.

16. The method according to claim 14, wherein said identifying includes identifying timing of a second differential of pressure above a second differential threshold.

17. The projectile tracking system according to claim 1 comprising:

a tracking device hosting the plurality of acoustic sensors, which comprise at least three acoustic sensors, wherein the tracking device rigidly holds the plurality of acoustic sensors spaced apart from each other;

a stand configured to rigidly hold said tracking device and the acoustically reflective surface so that said plurality of acoustic sensors are each separated by a respective shortest straight, line distance selected so that, for each respective acoustic sensor, a time delay between arrival of a projectile supersonic shockwave at the respective acoustic sensor and arrival of a reflection of said projectile supersonic shockwave from said acoustically reflective surface at the respective acoustic sensor is at least the sensing relaxation time of the respective acoustic sensor, said respective shortest straight line distance being at least double said sensing relaxation time multiplied by a speed of sound.

18. The projectile tracking system according to claim 1, wherein the processor is configured to determine from said timing of arrival of said supersonic shockwave, said timing of arrival of said reflection, said spatial relationship between said plurality of acoustic sensors, and said spatial relationship between said plurality of acoustic sensors and said acoustically reflective surface, a position at which said projectile intersects with a plane of said acoustically reflective surface.

19. The projectile tracking system according to claim 18, wherein the plane of the acoustically reflective surface is orientated generally extending vertically.

20. The method according to claim 13, wherein said determining said at least a portion of said trajectory of the projectile comprises determining from said timing of arrival of said supersonic shockwave, said timing of arrival of said reflection, said known spatial relationship between said plurality of acoustic sensors, and said spatial relationship between said plurality of acoustic sensors and said acoustically reflective surface, a position at which said projectile intersects with a plane of said acoustically reflective surface.

* * * * *